United States Patent [19]
Shiga et al.

[11] Patent Number: 5,508,577
[45] Date of Patent: Apr. 16, 1996

[54] ELECTRIC ROTATING MACHINE

[75] Inventors: Tsutomu Shiga, Nukata; Nobuyuki Hayashi, Nagoya; Masanori Ohmi, Anjo; Masami Niimi, Handa; Mitsuhiro Murata, Anjo, all of Japan

[73] Assignee: Nippondenso Co., Ltd., Kariya, Japan

[21] Appl. No.: 323,346

[22] Filed: Oct. 14, 1994

[30] Foreign Application Priority Data

| Oct. 15, 1993 | [JP] | Japan | 5-258717 |
| Oct. 15, 1993 | [JP] | Japan | 5-258720 |
| Oct. 15, 1993 | [JP] | Japan | 5-258731 |
| Nov. 15, 1993 | [JP] | Japan | 5-284766 |
| Dec. 21, 1993 | [JP] | Japan | 5-322810 |
| Dec. 22, 1993 | [JP] | Japan | 5-323877 |
| May 31, 1994 | [JP] | Japan | 6-117993 |
| Sep. 14, 1994 | [JP] | Japan | 6-219717 |

[51] Int. Cl.$^6$ .................................................. H02K 3/04
[52] U.S. Cl. ............................ 310/201; 310/45; 310/91; 310/237; 310/248; 310/262
[58] Field of Search .................................. 310/198, 184, 310/261, 262, 200, 201, 206, 208, 233, 91, 45, 248, 42

[56] References Cited

U.S. PATENT DOCUMENTS

| 3,209,187 | 9/1965 | Angele | 310/266 |
| 4,591,750 | 5/1986 | Major et al. | |
| 4,833,769 | 5/1989 | Tomite et al. | |
| 5,130,596 | 7/1992 | Umeki | 310/234 |
| 5,443,553 | 8/1995 | Shiga et al. | 74/7 R |

FOREIGN PATENT DOCUMENTS

| 288328 | 10/1988 | European Pat. Off. |
| 387666 | 9/1990 | European Pat. Off. |
| 2534085 | 4/1984 | France |
| 2127556 | 12/1972 | Germany |
| 3813317 | 11/1988 | Germany |
| 50-100505 | 8/1975 | Japan |
| 194541 | 8/1988 | Japan |
| 1-218341 | 8/1989 | Japan |

*Primary Examiner*—R. Skudy
*Attorney, Agent, or Firm*—Cushman, Darby & Cushman

[57] ABSTRACT

The provision of an electric rotating machine which can reduce the mechanical and thermal loads applied thereto. Coil arms and coil trunks are provided in roughly parallel orientation to the end faces of an armature core only through insulating rings and insulating spacers. Metal brush is disposed on coil arms, whereby the overall length of the armature can be remarkably shortened. In addition, a commutator, conventionally necessary, can be eliminated, whereby the length of the production process for the armature can be reduced. Moreover, in an arrangement where projections of the upper coil arm are fit in holes of the insulating spacer, as the displacement of the upper coil arm towards the outer periphery is regulated, the length of the axial protrusions of the upper coil arm from the end face of the armature core can be minimized. In addition, as extension portions and of the coil trunks are strongly pressed against and fixed to the side of armature core by fixing members, the resistance to the centrifugal force can be remarkably improved. Furthermore, as the extension portion of the lower coil arm is fit in a recessed part of the insulating spacer, the displacement of the lower coil arm in the axial direction towards the outer periphery can be prevented. Accordingly, the electric rotating machine according to the present invention can withstand more than two times as high a rotational speed as that of the conventional structure.

24 Claims, 21 Drawing Sheets

100

533,536   534,537

534,537
538,539   533,536

533,536
538,539   534,537

ELECTRIC ROTATING MACHINE

CROSS REFERENCE TO RELATED APPLICATIONS

This application is based upon and claims priority from Japanese Patent Application No. 5-258717 filed Oct. 15, 1993; Japanese Patent Application No. 5-258720 filed Oct. 15, 1993; Japanese Patent Application No. 5-258731 filed Oct. 15, 1993; Japanese Patent Application No. 5-284766 filed Nov. 15, 1993; Japanese Patent Application No. 5-322810 filed Dec. 21, 1993; Japanese Patent Application No. 5-323877 filed Dec. 22, 1993; Japanese Patent Application No. 6-117993 filed May 31, 1994; and Japanese Patent Application No. 6-219717 filed Sep. 13, 1994, with the contents of each document being incorporated herein by reference.

BACKGROUND OF THE INVENTION

1. Field of the Invention

The present invention generally relates to an electric rotating machine. More particularly, the present invention relates to an electric rotating machine such as a starter motor for vehicles that can suitably be used as an electric motor for high-speed rotations.

2. Related Art

Japanese Unexamined Patent Publication No. 2-241346, which corresponds to U.S. Pat. No. 5,130,596, discloses an electric rotating machine having upper and lower armature coils held within slots of an armature core. The coils are extended in the axial direction to be cylindrical, with the outer periphery of the upper coil being smaller in diameter than the outer periphery of the armature core. The metal brush contacts the outer periphery of the cylindrical surface. In this arrangement, the upper and lower armature coils are fed with electric current through the metal brush.

However, such an electric motor, particularly when used for high-speed rotation, has the problem that high-speed rotation is disabled by heavy mechanical loads caused by burdens on the molded resin cylinder, which holds the coils composing the contact face for the metal brush. The burdens on the molded resin cylinder are due to the centrifugal force developed on the commutator face of the coil, heavy thermal loads caused by the effect of the resisting heat generated on the commutator face, and the frictional heat generated on the metal brush in high-speed rotations.

SUMMARY OF THE INVENTION

In view of the above problem, the present invention has as its primary object the provision of an electric rotating machine that can reduce mechanical and thermal loads.

It is a further object of the present invention to provide an electric rotating machine which is suited for downsizing.

It is a still further object of the present invention to provide an electric rotating machine which is suited for simplification of manufacturing processes.

The electric rotating machine according to the present invention is basically constructed as follows. The electric rotating machine includes an armature core including slots, a shaft rotatably supporting the armature core, upper coil trunks and lower coil trunks housed within the slots of the armature core, lower coil arms electrically connected at one end parts of the lower coil trunks, respectively disposed roughly perpendicular to the shaft and extending in the direction of the shaft, and upper coil arms electrically connected at one end parts to the upper coil trunks, respectively disposed roughly perpendicular to the shaft and extending in the direction of the shaft, and connected at the other end parts to the other end parts of the lower coil arms respectively.

In the electric rotating machine according to the present invention, the lower and upper coil arms of the upper and lower armature coils are disposed roughly perpendicular to the shaft, and the upper coil arms are connected to the other end parts of the lower coil arms. In this arrangement, the lower and upper coil arms can be housed within a small clearance protruding from the armature core, and the resistance to the centrifugal force can be increased. Therefore, the mechanical loads can be substantially reduced, and the lower and upper coil arms can be disposed in the vicinity of the armature core. As a result, the heat generated at the lower and upper coil arms can easily be dissipated to the side of the armature core, whereby the thermal loads can also be reduced.

Further, according to the present invention, upper coil arms has a unique shape and arrangement for functioning as a commutator, for providing grooves which enhance air flow therethrough, and/or for providing good dissipation of heat generated by metal brush.

Still further, according to the present invention, upper coil arms and lower coil arms have unique shape and arrangement with armature core and shaft for keeping fixed relation with armature core and shaft.

BRIEF DESCRIPTION OF THE DRAWINGS

Other objects, features and characteristics of the present invention, as well as the functions of the related parts, will be appreciated from the following detailed description, appended claims, and the drawings, all of which from a part of this application. In the drawings:

FIG. 31A through 31C shows an eighth embodiment in which FIG. 31A is an axial cross-sectional view illustrating the state before an armature coil holding portions and are welded. FIG. 31B is an axial front view, and FIG. 31C is a main enlarged plan view illustrating shape of protrusion portion;

DETAILED DESCRIPTION OF THE PRESENTLY PREFERRED EXEMPLARY EMBODIMENTS

The first embodiment of the electric rotating machine according to the present invention will be described with reference to FIGS. 1 through 11.

Figure 1:
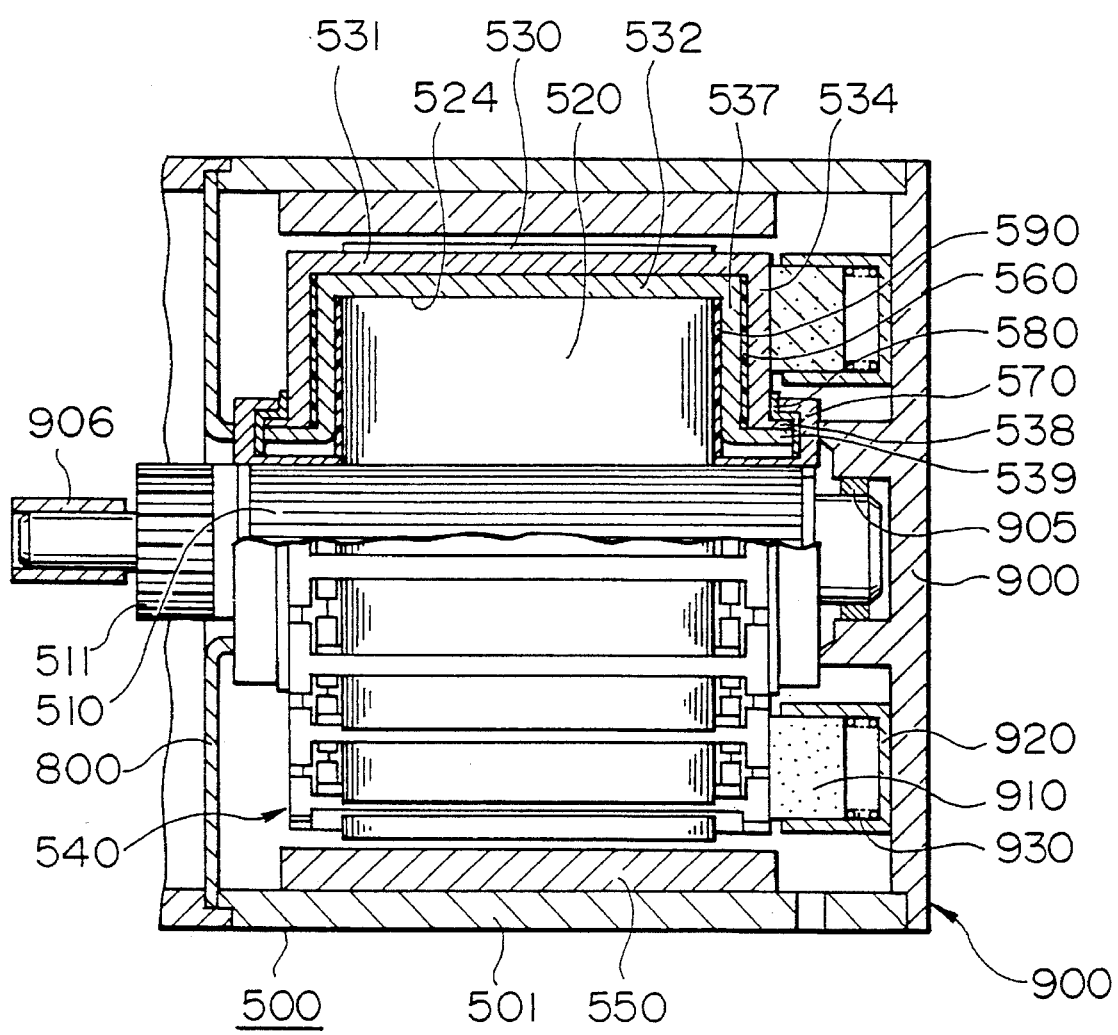
FIG. 1 is an axial crossesectional view illustrating an electric rotating machine according to a first embodiment of the present invention.
Figure 2:
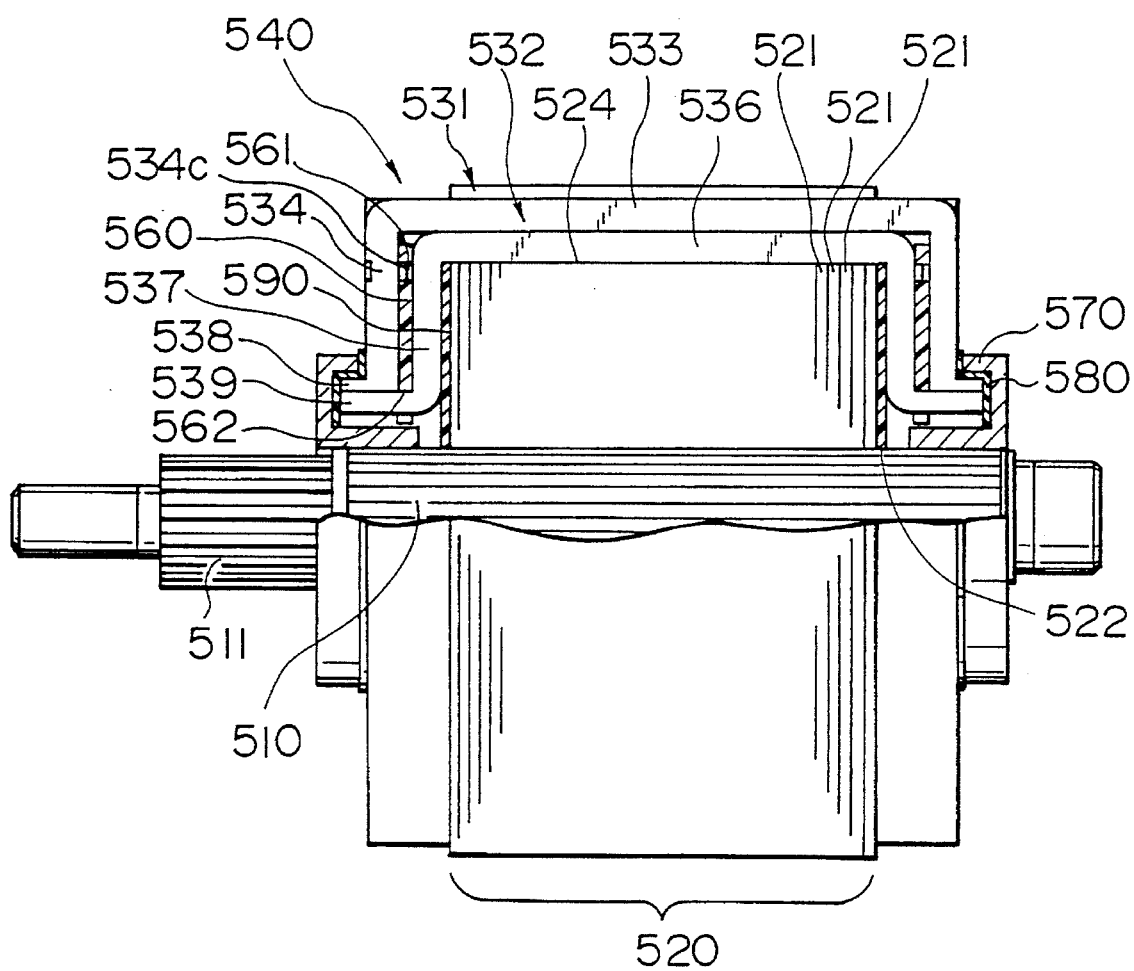
FIG. 2 is an axial cross-sectional view illustrating a rotor of the electric rotating machine of the first embodiment.

As illustrated in FIGS. 1 and 2, electric rotating machine 500 includes shaft 510, an armature including armature core 520 rotatably and integrally fixed on shaft 510 and armature coil 530, and fixed magnetic poles 550 for rotating the armature. Fixed magnetic poles 550 are fixed on the inner periphery of yoke 501.

Shaft 510 is rotatably held by metal bearing 906 provided in a supporting member (not illustrated) and a metal bearing 905 fixed on the inner periphery of end frame 900. At the front end of shaft 510 is formed gear 511 engaging with a gear of planetary gear mechanism (not illustrated).

Figure 3:
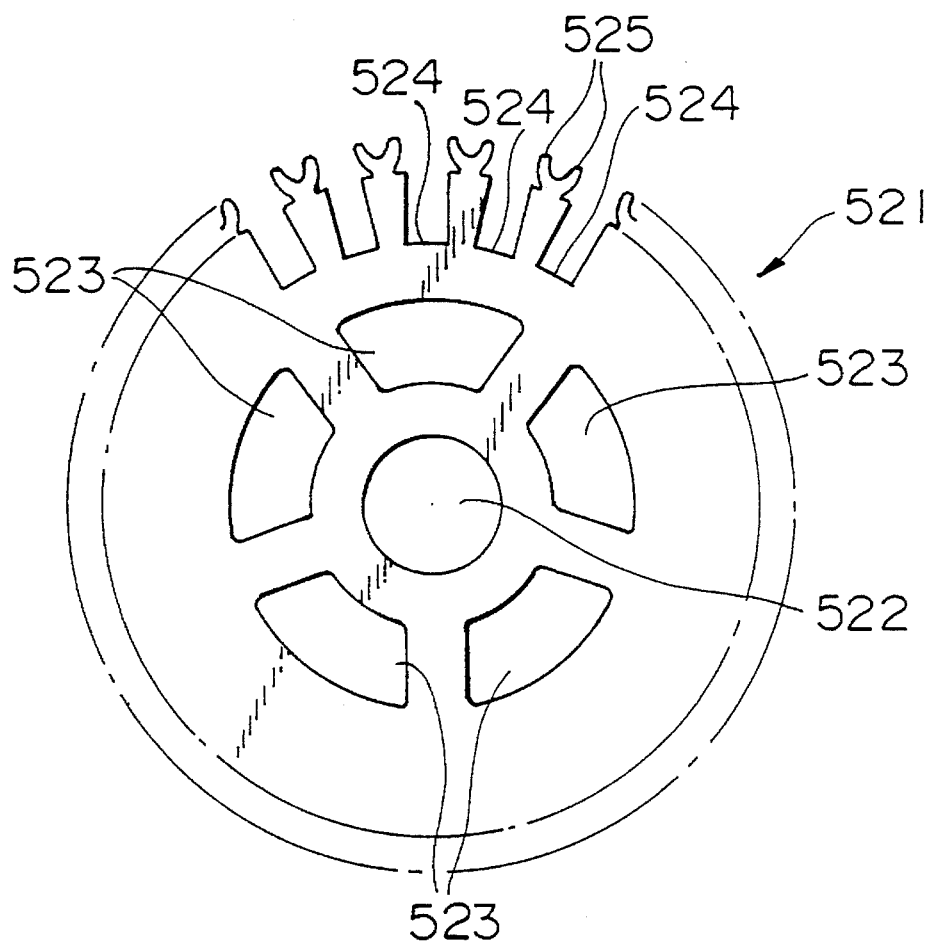
FIG. 3 is a plan view illustrating an armature core of the electric rotating machine of the first embodiment.

Armature core 520 is formed by stacking a multiplicity of ring-shaped core plates 521 illustrated in FIGS. 2 and 3, and shaft 510 is force or press fit in a hole 522 made in the center of plates 521. Each core plate 521 is punched out of a thin steel plate on a press, and insulated on the surface. On the inside diameter side of core plate 521 (around the hole 522) are formed a plurality of punched holes 523, which reduce the weight of core plate 521. On the outer periphery of core plate 521, a plurality of axially extending (e.g., 25) slots 524 are formed to house armature coil 530. On the outer periphery of core plate 521 and between the respective slots 524 adjacent to each other are formed set claws 525 for holding armature coil 530 housed within slot 524 in position. The claws 525 will be described in more detail later.

Armature coil 530 in this embodiment adopts a double-layer coil which comprises a plurality of (e.g., 25) upper coil bars 531 composing an upper armature coil and the same number of lower coil bars 532 composing a lower armature coil, wherein upper coil bar 531 and lower coil bar 532 are mutually stacked in the radial direction. Each upper coil bar 531 is combined with each lower coil bar 532 and each end part of each upper coil bar 531 is electrically connected to the end part of each lower coil bar 532 to form a loop coil.

Upper coil 531 made of a highly conductive metal (e.g., copper) extends parallel to fixed magnetic pole 550. Upper coil bar 531 includes upper coil trunk 533 held within slot 524 and a pair of upper coil arms 534 extending from the respective ends of the upper coil trunk 533 turning innards therefrom to be perpendicular to the axial direction of shaft 510 and roughly parallel to both axial side faces 522 of the armature core 520. Here, both ends of the upper coil trunk 533 are joined to recessed parts 534a (FIG. 6) formed at one end of the respective pair of upper coil arms 534.

Figure 6:
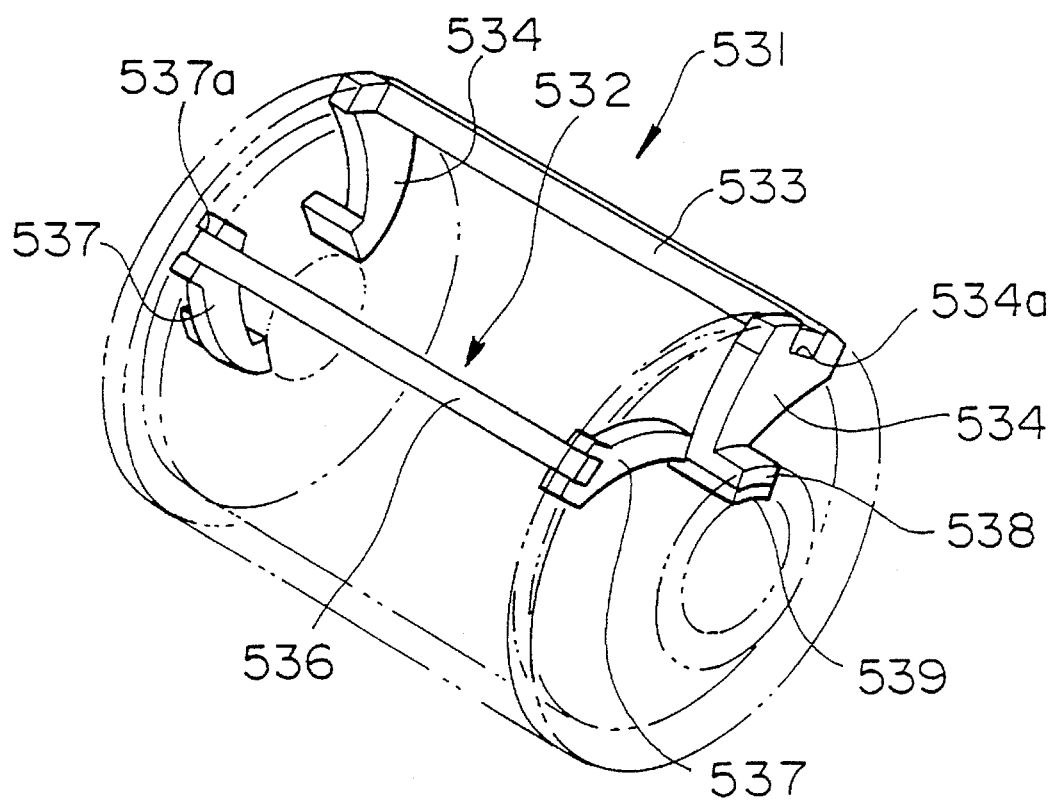
FIG. 6 is a perspective outline view illustrating the layout of upper and lower coil trunks of the electric rotating machine of the first embodiment.
Figure 7:
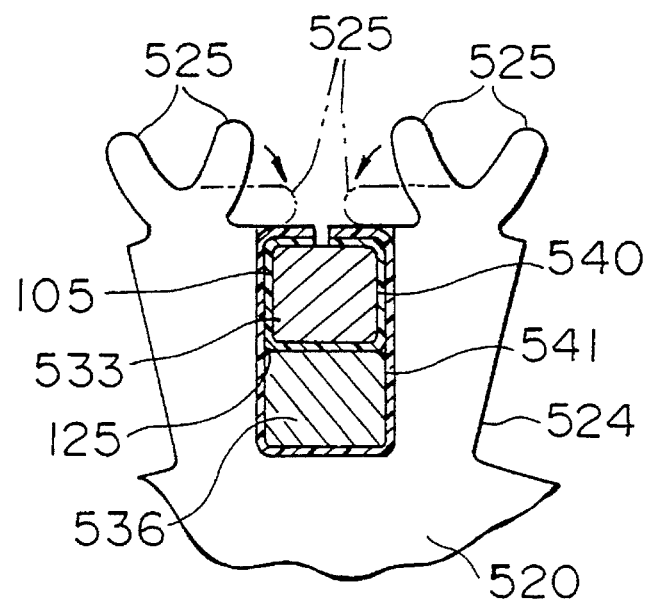
FIG. 7 is a cross-sectional view illustrating the upper and lower coil trunks housed within the slots.

Upper coil trunk 533 is a linear bar with rectangular cross section as illustrated in FIGS. 4 through 7. The periphery of upper coil trunk 533 is covered with upper insulating film 540 (e.g., a thin resin film, such as nylon, or paper). Upper coil trunk 533 covered with the upper insulating film 540 is firmly held within slot 524 together with a lower coil trunk 536 (described later) as illustrated in FIG. 7.

As illustrated in FIG. 6, one of the pair of upper coil arms 534 is inclined to the forward side in the rotating direction of armature, and the other upper coil arm 534 is inclined to the backward side in the rotating direction. The pair of upper coil arms 534 are inclined to the radial direction at the same angle to upper coil trunk 533 and formed in the same shape. Accordingly, even if upper coil arms 534 are horizontally turned 180° around the center of upper coil bar 531, upper coil bar 531 takes the same shape as if upper coil arms 534 were not turned. That is, as there is no difference in shape between the pair of upper coil arms 534, the assembly process of assembling upper coil bars 531 to armature coil 520 has a high efficiency.

Of the pair of upper coil arms 534, one located at the side of the end frame 900 directly contacts, as commutator, the metal brush 910 (described later) to electrically energize the armature coil 530. For this purpose, at least the surfaces of upper coil arms 534 in contact with brush 910 are smooth. The electric rotating machine of this embodiment does not require any separate commutator for electrically energizing armature coil 530. As a result, as there is no need to provide any separate commutator, the number of necessary components can be reduced. In addition, as there is no need to provide any separate commutator within yoke 501, the structure of the electric rotating machine can be downsized in the axial direction.

Moreover, as upper coil arm 534 directly contacts the metal brush 910, the heat generated by the sliding contact between upper coil arm 534 and metal brush 910 is transmitted from upper coil arm 534 to upper coil trunk 533, armature core 520, shaft 510, etc. As armature coil 530, armature core 520, shaft 510, etc. are considerably larger in heat capacity compared with conventional separately provided commutators, the sliding contact portion between upper coil arm 534 and metal brush 910 can be maintained at a low temperature.

Figure 8:
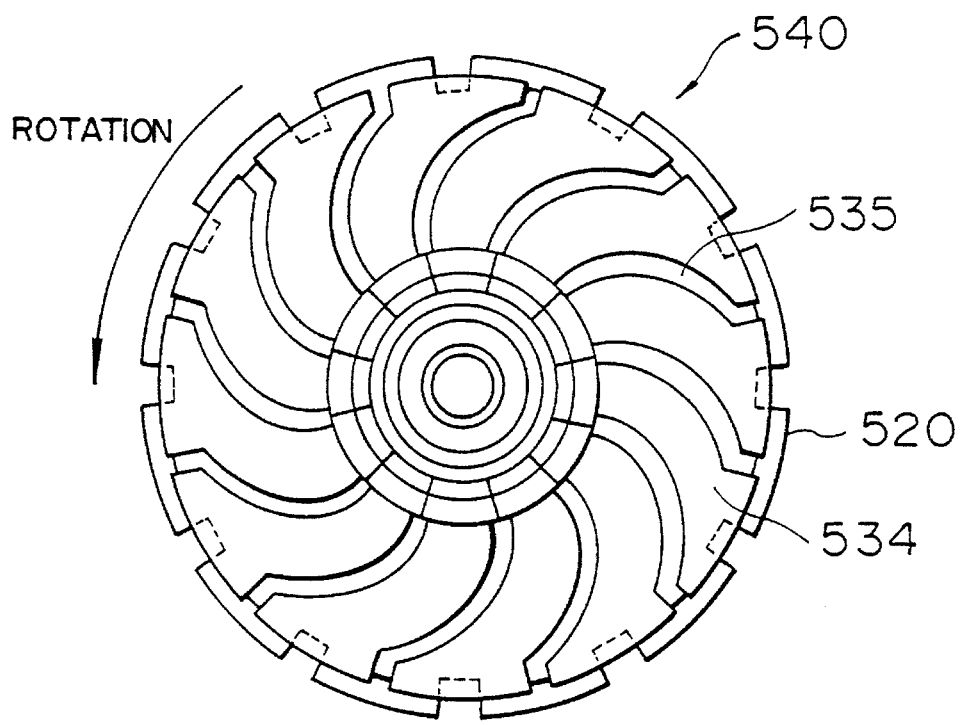
FIG. 8 is a plan view illustrating the armature of the first embodiment.

As illustrated in FIG. 8, each upper coil arm 534 gradually expands in the radial direction towards the distal end, and the peripheral clearance between mutually adjacent upper coil arms 534 is almost uniform from the inner periphery thereof to the outer periphery thereof. This arrangement substantially enlarges the contact area between metal brush 910 and upper coil arm 534. As a result, the heat of metal brush 910 is easily transmitted to the coil bars 531, whereby the temperature of metal brush 910 can be maintained at a substantially low level. It is to be noted that FIG. 8 is depicted to illustrate the shape of the upper coil arm 534 for easy understanding, and the number of the upper coil arms 534 does not match with the number of the slots 524 illustrated in FIG. 3.

Furthermore, the clearance groove (space groove) between mutually adjacent upper coil arms 534 in contact with metal brush 910 is shaped into a rough spiral developing backwards in the rotating direction towards the outer periphery thereof as illustrated in FIG. 8. By shaping clearance grooves 535 into a rough spiral in this way, metal brush 910 contacts the upper coil arm 534 serially from the inside thereof where wind velocity is low, to the outside thereof where wind velocity is high. As a result, metal brush 910 has a sliding contact with upper coil arm 534 and can be prevented from jumping on upper coil arm 534.

In addition, owing to clearance groove 535 provided between mutually adjacent upper coil arms 534, when armature coil 530 rotates, centrifugal wind produced by clearance grooves 535 between mutually adjacent upper coil arms 534 flows from the inside to the outside. The centrifugal wind produced by the rotation of clearance groove 535 between mutually adjacent upper coil arms 534 in contact with metal brush 910 is used to cool the heat generated by the sliding contact between metal brush 910 and upper coil arms 534 and blow off the metal brush wear powder to the outside radially (described later).

Figure 4:
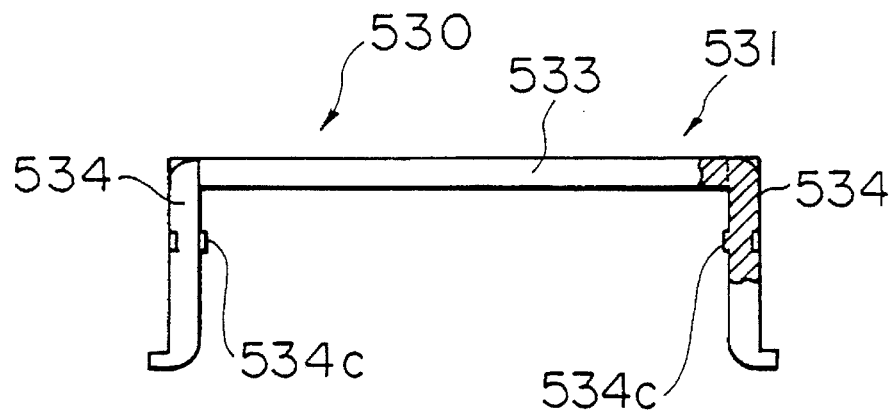
FIG. 4 is a plan view, partly in cross section, illustrating a part of an armature coil of the electric rotating machine of the first embodiment.
Figure 5:
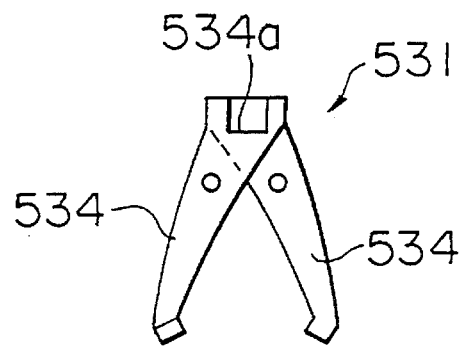
FIG. 5 is a plan view illustrating a coil arm of the electric rotating machine of the first embodiment.
Figure 9:
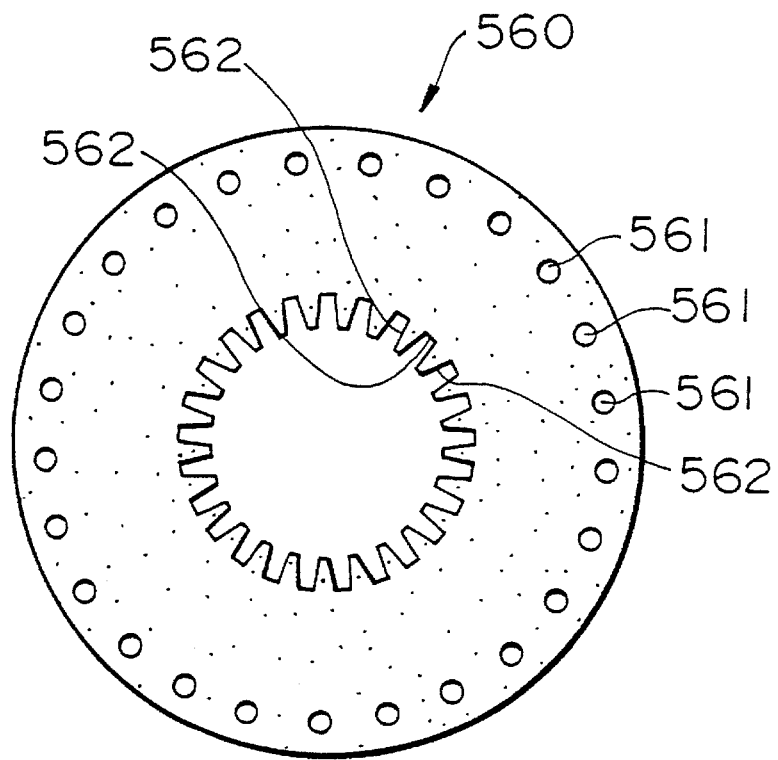
FIG. 9 is a plan view illustrating an insulating spacer of the first embodiment.

The pair of upper coil arms 534 have small projections 534c protruding innards in the axial direction on the inner surfaces of upper coil arms 534, with projections 534c facing each other as illustrated in FIG. 4. Projection 534c is disposed between upper coil arm 534 and lower coil arm 537 (described later) and fit into a hole (positioning part) 561 formed in insulating spacer (insulator) 560, as shown in FIG. 9, that insulates upper coil arm 534 from lower coil arm 537.

Lower coil bar 532 composing the lower armature coil is made of the same highly conductive material (e.g., copper) as the upper coil bar 531, and extends parallel to fixed magnetic pole 550. Lower coil bar 532 includes lower coil trunk 536 held within slot 524 and a pair of lower coil arms 537 extending from both the respective ends of lower coil trunk 536 turning innards therefrom to be perpendicular to the axial direction of shaft 510. Both ends of lower coil trunk 536 are inserted into recessed parts 537a formed at one end of the respective pair of lower coil arms 537 and joined thereto.

Upper coil arms 534 are insulated from lower coil arms 537 by insulating spacer 560. Lower coil arms 537 are insulated from armature core 520 by insulating ring 590 made of resin (e.g., nylon or phenolic resin.)

Lower coil trunk 536 is a linear bar with rectangular cross section as illustrated in FIGS. 4 through 7. The periphery of lower coil trunk 536 is covered with lower insulating film 541 (e.g., nylon or paper). Lower coil trunk 536 covered with lower insulating film 541 is firmly held within the slot 524 together with upper coil trunk 533 covered with upper insulating film 540 as illustrated in FIG. 7.

Of the pair of lower coil arms 537, one located at the side of gear 511 is inclined in the reverse direction to the inclination direction of upper coil arm 534. The other lower coil arm 537 located at the rear side is also disposed so as to be inclined in the reverse direction to the inclination direction of upper coil arm 534. The pair of lower coil arms 537 are inclined to the radial direction at the same angle to lower coil trunk 536 and formed in the same shape. Accordingly, as is the case with the upper coil bar 531, even if lower coil arms 537 are horizontally turned 180° around the center of lower coil bar 532, lower coil bar 532 takes the same shape as if lower coil arms 537 were not turned. That is, as there is no difference in shape between the pair of lower coil arms 537, the assembly of lower coil bars 532 to armature coil 520 has a high efficiency.

At the inner peripheral end parts of each of the pair of lower coil arms 537 are provided lower inner extension portions 539 extending in the axial direction. The outer periphery of lower inner extension portion 539 is fit in holes 561 formed in the outer peripheral portion of insulating spacer 560. The outer periphery of lower inner extension portion 539 is laid on the inner periphery of upper inner extension portion (protruded portion) 538 formed at the end of upper coil arm 524 and electrically and mechanically connected thereto by a joining technique, such as welding. Here, the inner periphery of lower inner extension portion (protruded portion) 539 is distantly disposed from shaft 510 for purpose of insulation.

Figure 10:
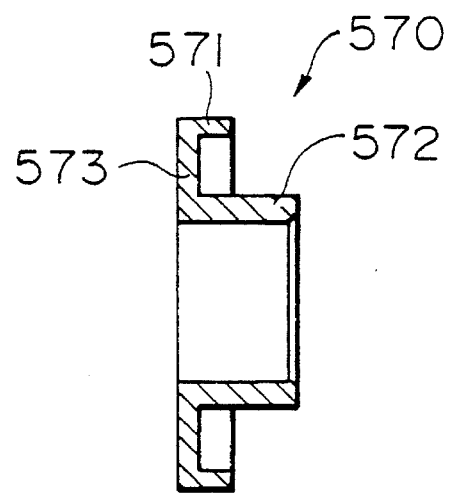
FIG. 10 is a cross-sectional view illustrating a fixing member of the first embodiment.
Figure 11:
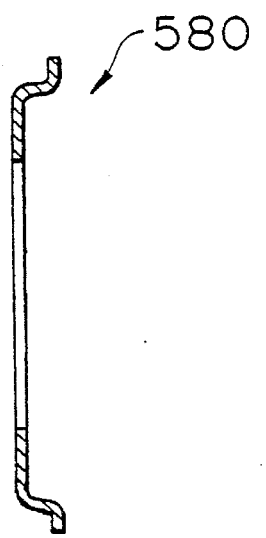
FIG. 11 is a cross-sectional view illustrating an insulating cap of the first embodiment.

At the inner peripheral end parts of each of the pair of upper coil arms 534 are provided upper inner extension portions 538 extending in the axial direction. The inner periphery of upper inner extension portion 538 is laid on the outer periphery of above-described lower inner extension portion 539 formed at the inner end of lower coil bar 532 and electrically and mechanically connected thereto by a joining technique, such as welding. The outer periphery of upper inner extension portion 538 contacts, through insulating cap 580, the inside of outer peripheral annular part 571 of fixing member (collar) 570 press fit on shaft 510 and fixed thereto as shown in FIGS. 10 and 11.

Insulating spacer 560 is a thin plate ring made of resin (e.g., epoxy resin, phenolic resin, nylon). In the outer peripheral portion thereof are provided a plurality of holes 561 in which projections 534c of upper coil arms 534 are fit as illustrated in FIG. 9. On the inner peripheral portion of insulating spacer 560 are provided recessed parts 562 in which lower inner extension portion 539 formed on the inside of lower coil arms 537 are fit. Holes 561 and recessed parts 562 of insulating spacer 560 are used to position and fix armature coil 530. The plurality of holes 561 in which projections 534c of upper coil arms 534 are fit have been preformed in the outer peripheral portion of insulating spacer 560. It is also acceptable that upper coil arms 534 are stamped from the outer peripheral side thereof to form the projections 534c on upper coil arms 534 and simultaneously form holes 561 in insulating spacer 560 by using projections 534c as stamps. According to this method, upper coil arms 534 are hardened due to plastic deformation, whereby the wear thereof that may be caused by sliding contact with the metal brush 910 can be reduced.

Fixing member 570 is an iron annular material. As illustrated in FIG. 10, fixing member 570 comprises inner peripheral annular part 572 to be press fit on shaft 510, regulating ring. 573 extending in the axial direction for preventing upper coil arms 534 and lower coil arms 537 from unfolding in the axial direction, and outer peripheral annular part 571 covering upper inner extension portions 538 of upper coil arms 534 for preventing the internal diameter of armature coil 530 from enlarging due to centrifugal force. Here, fixing member 570 has disc-like insulating cap 580 made of a resin (e.g., nylon), as illustrated in FIG. 11, between upper coil arm 534 and lower coil arm 537 to insulate upper coil arm 534 from lower coil arm 537.

Fixing member 570 is disposed in front of the starter and contacts the rear of front partition wall 800 disposed adjacent to the front of fixing member 570 to serve also as a thrust pad for regulating the forward displacement of armature 540. On the other hand, fixing member 570 disposed at the back of the starter contacts the front of end frame 900 disposed adjacent to the rear of fixing member 570 to also serve as a thrust pad for regulating the backward displacement of armature 540.

Each fixing member 570 fixing the inside end part of armature 530 serves as a thrust pad for armature 540 as described above. Thus, there is no need to specially provide any thrust pad for armature 540. As a result, the number of the parts and components required for a starter motor can be reduced as well as allowing for reduction in the number of man-hours needed for assembly.

As a means for positioning and fixing upper coil bars 531 and lower coil bars 532 of armature coil 530 to armature core 520, slots 524 and fixing claws 525 of armature core 520, holes 561 and recessed parts 562 of insulating spacer 560, and fixing members 570 which are press fit on the shaft 510 are utilized.

Slot 524 of armature core 520 houses upper coil trunk 533 and lower coil trunk 536. By bending fixing claws 525 towards the inside diameter as indicated by the arrows of FIG. 7, upper coil trunk 533 and lower coil trunk 536 are so firmly fixed in each slot 524 that the displacement of upper coil trunk 533 and lower coil trunk 536 towards the outer diameter under a centrifugal force applied thereto can be prevented. Here, it should be noted that as the outer periphery of upper coil trunk 533 is insulated by two insulating films, i.e., lower insulating film 541 and upper insulating film 540, sufficient insulation is ensured even when fixing claws 525 are bent towards the inside diameter so as to encroach thereon.

Recessed parts 562 formed on the inner periphery of insulating spacer 560 in which lower inner extension portions 539 of lower coil arms 537 are fit position lower coil arms 537. Recessed parts 562 also prevent the displacement of lower coil arms 537 towards the outside diameter under a centrifugal force applied to lower coil arms 537.

Holes 561 made in the outer periphery of insulating spacer 560 in which projections 534a of upper coil arms 534 are fit position the upper coil arms 534. Holes 561 also prevent the displacement of upper coil arms 534 towards the outside diameter under a centrifugal force applied to upper coil arms 534.

Fixing members 570 hold upper inner extension portion 538 and lower inner extension portion 539 joined to each other to prevent the displacement of the inside diameter portion of armature coil 530 towards the outside diameter under a centrifugal force applied thereto. Furthermore, fixing members 570 regulate the displacement of the axial end part of upper inner extension portion 538 and lower inner extension portion 539 joined to each other to prevent the elongation of the axial length of armature coil 530. In order to prevent the elongation of the axial length of upper coil arms 534 and lower coil arms 537 when the electric rotating machine as the starter motor is in operation, it is necessary to secure a space within the starter to accommodate such elongation. In this embodiment, however, as fixing members 570 prevent the elongation of the axial length of upper coil arms 534 and lower coil arms 537, the starter requires no such spare space, whereby the axial length of the starter can be shortened.

The procedure for assembling the armature will now be described in detail.

First, armature core 520 stacked with core plates 521 is press fit around shaft 510. Second, insulating rings 590 are disposed at both sides of armature core 520. Third, lower coil trunks 536 of lower coil bar 532 are housed within respective slots 524 together with lower insulating film 541.

Fourth, insulating spacers 560 are attached to both sides of lower coil arms 537 of lower coil bars 532, and lower inner extension portions 539 are disposed within recessed parts 562, whereby the positioning of lower coil bars 532 is completed.

Fifth, upper coil trunks 533 of upper coil bar 531 are housed within respective slots 524 together with upper insulating film 540. In this process, projections 534c of upper coil arms 534 are fit in holes 561 of insulating spacers 560, whereby the positioning of upper coil bars 531 is completed.

Sixth, upper inner extension portion 538 of upper armature coil trunk 533 and lower inner extension portion 539 of lower armature coil trunk 536 are joined to each other by a joining technique, such as welding, to ensure an electrical and a mechanical connection.

Seventh, each fixing claw 525 of armature coils 520 is bent towards the inner periphery to fix upper coil trunk 533 and lower coil trunk 536 within each slot 524. Then, fixing members 570 are press fit on shaft 510 from both sides to cover the outer periphery of upper inner extension portions 538 of armature coils 530, whereby the displacement of upper coil arms 534 in the axial direction towards the outer periphery can be prevented.

By using the above procedure, the assembly of the armature is completed.

In this embodiment, permanent magnets fixed on yoke 501 with sleeves contacted to the inner periphery thereof are used as fixed magnetic poles 550. It is also acceptable that a field coil electrically generating a magnetic force may be used instead of the permanent magnets as fixed magnetic poles 550.

At an end part of yoke 501 of electric rotating machine 500 is fixed end frame 900. On end frame 900, metal brush holder 920 is provided. On the inside of the metal brush holder 920 is provided metal brush 910 slidably movable in the axial direction. Metal brush 910 is pressed against upper coil arms 534 of armature coils 530 by spring 930 housed within metal brush holder 920.

Figure 12:
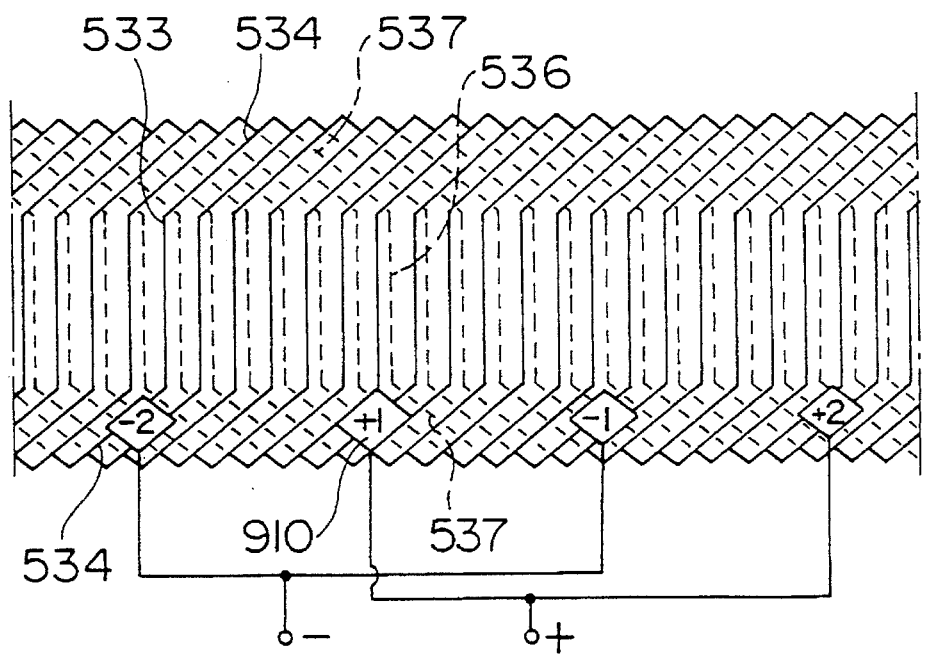
FIG. 12 is a typical view illustrating winding of the armature coil of the first embodiment.

FIG. 12 typically illustrates the winding of the armature coil 530. Illustrated in this Figure is the case where metal brush 510 is disposed on upper coil arms 534.

In the electric rotating machine according to the present invention, upper coil arms 534 of upper armature coil bars 531 and lower coil arms 537 of lower armature coil bars 532 are disposed so as to be roughly parallel to each other on the axial end faces of armature core 520 only through the insulating rings 590 and the insulating spacers 560 with metal brush 910 being disposed on upper coil arms 534. In this arrangement, the overall length of the armature can significantly be shortened. Also in this arrangement, as a commutator, which has conventionally been required separately from armature coil, can be dispensed with, thus allowing the manufacturing procedure for the armature to be shortened and simplified.

Furthermore, as projections 534c of upper coil arms 534 are fit in holes 561 of insulating spacer 560, the displacement of upper coil arms 534 towards the outer periphery is regulated, and the amount of the protrusions of upper coil arms 534 from the end faces of armature core 520 is small. In addition, as extension portions 538 of upper coil trunks 532 and extension portions 539 of lower coil trunks 533 are strongly pressed against and fixed to the axial side of armature core 520 by fixing members 570, the resistance to centrifugal force can be remarkably increased. Moreover, as extension portions 539 of lower coil arms 537 are fit in recessed parts 562 of insulating spacer 560, the displacement of lower coil arms 537 in the radial direction towards the outer periphery can be prevented. As a result, the armature of this embodiment can withstand more than two times as high a rotation speed as can conventional structures.

Furthermore, the heat generated at upper coil arms 534 with which metal brush 910 contacts is also transmitted relatively easily to armature core 520 through insulating spacers 560, lower coil arms 537 and insulating rings 590, and then discharged. In this arrangement, the rise in the temperature of metal brush 910 and this contact face thereof can also be reduced. This rise in the temperature can further be reduced by using high heat-conduction ceramic or the alternative for insulating spacers 560 and insulating caps 580.

In addition to the above, according to the present invention as illustrated in FIG. 8, upper coil arms 534 are arranged spirally and between mutually adjacent upper coil arms 534 are formed clearance grooves 535, roughly corresponding to the thickness of the coil arms, which ranges from about 1.5 mm to about 3.5mm. Clearance grooves 535 at the side of upper coil arms 534 with which metal brush 910 contacts are shaped protruding against the rotational direction of armature core 520, whereby clearance grooves 535 function as centrifugal fans by the rotation of the armature. That is, airflow is generated from the inner periphery of upper coil arms 534 to the outer periphery thereof. This airflow has a velocity of approximately 4 m/s at or around the outer periphery of upper coil arms 534 when the armature rotates at 8,000 rpm, exerting a cooling effect on upper coil arms 534 and metal brush 910.

Furthermore, by lap winding armature coil 530, clearance grooves 535 at the side not contacting the metal brush 910, i.e. on the side of reduction gear 511, are also shaped so as to protrude against the rotational direction of armature core 520. As a result, clearance grooves 535 can also function as centrifugal fans, whereby upper coil arms 534 at this side can also be cooled in the same way.

Moreover, by making a through hole in a part of yoke 501 of motor 500, electrical current leaks between the coils, due to powder worn off metal brush 910 caused when motor 500 is downsized, can be prevented by the above-described function as centrifugal fans. That is, the powder is completely discharged to the outside from the through hole of yoke 501.

As clearance grooves 535 are inevitably formed by inserting the armature coils 530 into slots 524 of armature core 520, there is no need to form clearance grooves 535 by machining or any other means, whereby the manufacturing cost can be remarkably reduced. In addition, as the thickness of clearance groove 535 can be set to the thickness of upper coil arm 534, clearance grooves 535 can be used sufficiently longer, even if the sliding surface of metal brush 910 is worn.

Furthermore, by using a metal for metal brush holder 920, the heat generated on metal brush 910 can be dissipated through metal brush holder 920.

FIGS. 13 through 17 illustrate other embodiments of the method for producing the armature coil, particularly the method for producing coil trunks 533 and 536 and coil arms 534 and 537 separately.

Figure 13:
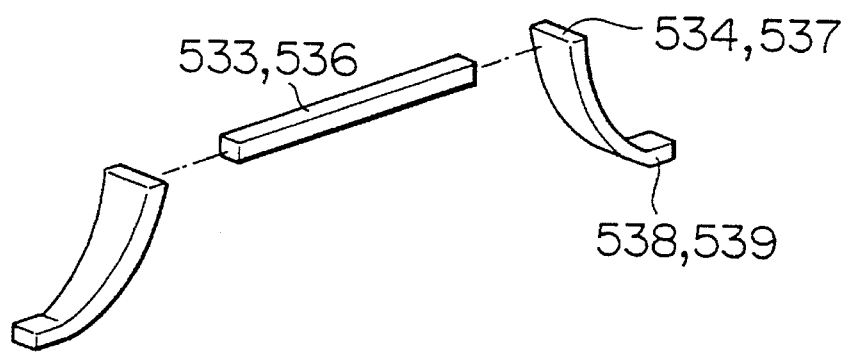
FIG. 13 is a perspective view illustrating another type of the armature coil.
Figure 14:
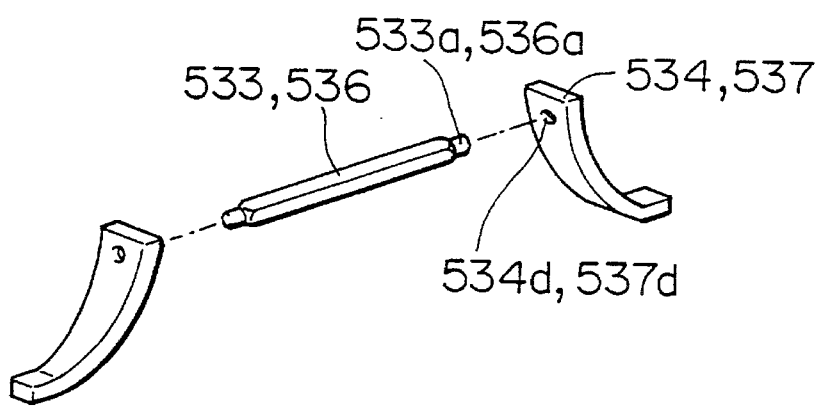
FIG. 14 is a perspective view illustrating still another type of the armature coil.

In FIGS. 13 and 14, upper coil arms 534 and lower coil arms 537 are joined to both ends of upper coil trunk 533 and lower coil trunk 536, respectively. Particularly in the embodiment illustrated in FIG. 14, in one end part of upper coil arm 534 and lower coil arm 537 are provided through holes 534d and 537d, respectively. In through holes 534d and 537d are fit small diameter portions 533a and 536a, respectively, of both ends of upper coil trunk 533 and lower coil trunk 536 and joined thereto respectively. It is also acceptable that small diameter portions 533a and 536a are shaped like square pillars. By fitting small diameter portions 534a and 537a in through holes 534d and 537d, the joining accuracy and the mechanical strength can be improved, and consequently the reliability can be improved.

Figure 15:
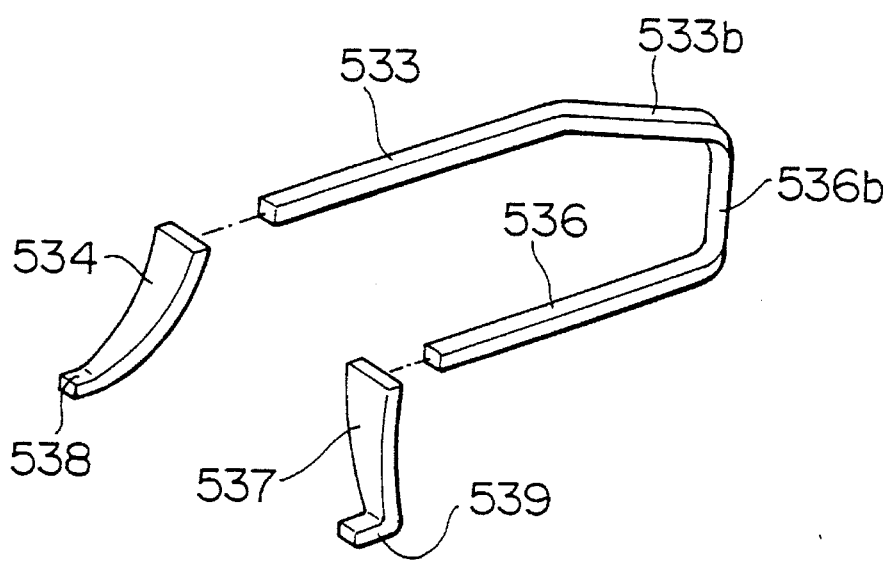
FIG. 15 is a perspective view illustrating still another type of the armature coil.

In the embodiment illustrated in FIG. 15, one end part of upper coil trunk 533 and lower coil trunk 536 are formed in one piece through connecting parts 533b and 536b, and to the other end part of upper coil trunk 533 and lower coil trunk 536 are joined one end part of upper coil arm 534 and lower coil arm 537, respectively.

In the above arrangement, as upper coil trunk 533 and lower coil trunk 536 can be produced separately from upper coil arm 534 and lower coil arm 537, the yield of the material of each component can be improved and mass production can be improved. Moreover, in producing the armature, it is also acceptable that linear coil trunks 533 and 536 are inserted into slots 524 of armature core 520 in advance and then one end part of upper coil arm 534 and lower coil arm 537 are joined to linear coil trunks 533 and 534. In this case, an armature core of semi-closed slot type or closed slot type can be used, whereby there is no need to provide fixed claws 525 to close the openings of slots 524 after coil trunks 533 and 536 have been inserted.

Next, description is provided of embodiments in which upper coil trunk 533 and lower coil trunk 536 are produced integrally with upper coil arm 534 and lower coil arm 537, respectively, with reference to FIGS. 16 and 17. Both embodiments adopt a production method by means of press machining which is advantageous in terms of production cost.

Figure 16A:
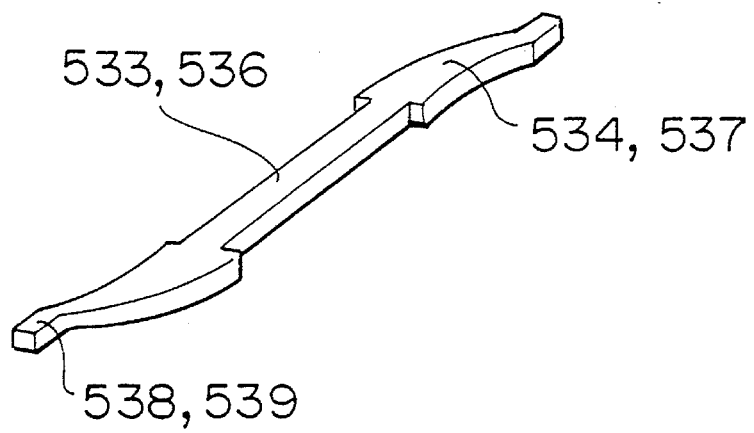
FIGS. 16A through 16C are perspective views illustrating the production procedure for the armature coil.
Figure 16B:
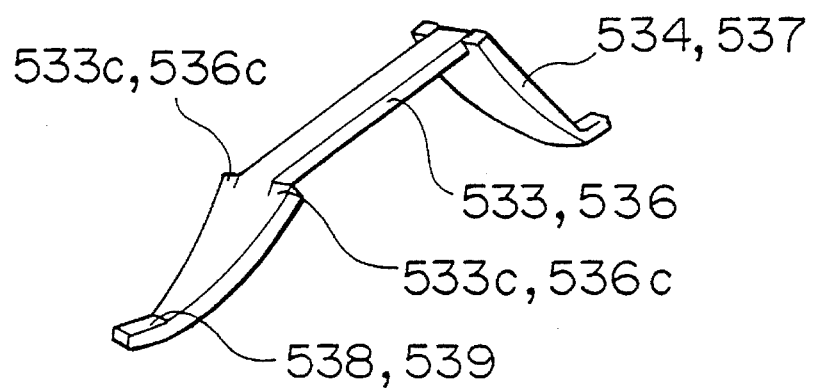
Figure 16C:
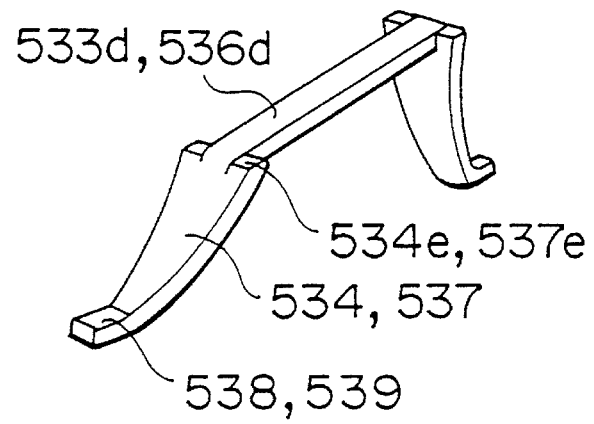

In the embodiment illustrated in FIGS. 16A through 16C, first, bar-like shaped upper coil trunk 533 and lower coil trunk 536, trapezoidal-shaped upper coil arm 534 and lower coil arm 537, and upper inner extension portion 538 and lower inner extension portion 539 are integrally stamped out of a plate material as illustrated in FIG. 16A. Here, the thickness is uniform throughout the stamped portions. Second, as illustrated in FIG. 16B, upper coil arm 534 and lower coil arm 537 are bent to the specified angle at the boundary portions between upper and lower coil trunks 533 and 536 and trapezoidal upper and lower coil arms 534 and 537, respectively. In this case, two cuts 533c and 536c are provided with the distance thereof approximating the width of coil trunks 533 and 536. Third, as illustrated in Fig. 16C, coil arms 534 and 537 are bent at roughly right angles to coil trunks 533 and 536, and then upper inner extension portion 538 and lower inner extension portion 539 are bent so as to be parallel to the coil trunks 533 and 536. In this arrangement, shoulders 534e and 537e of coil arms 534 and 537 respectively are roughly at the same level as top surfaces 533d and 536b of coil trunks 533 and 536, respectively. Accordingly, coil arms 534 and 537 up to the vicinity of top surfaces 533d and 536d of the coil trunks can be used as the contact face for metal brush 910, whereby the commutator area can widely and effectively be obtained, and the current density of the commutator surface can be reduced.

Figure 17A:
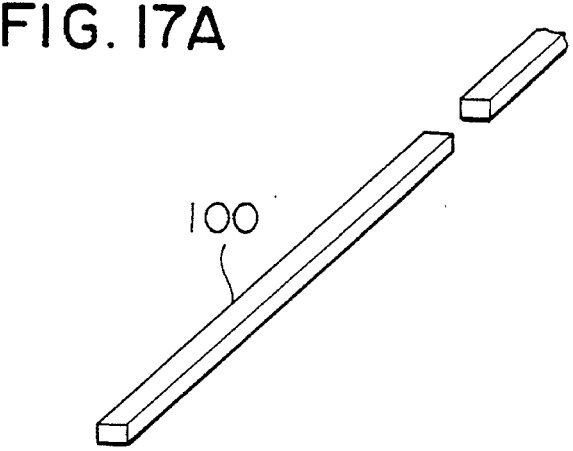
FIGS. 17A through 17D are perspective views illustrating the production procedure for another armature coil.
Figure 17B:
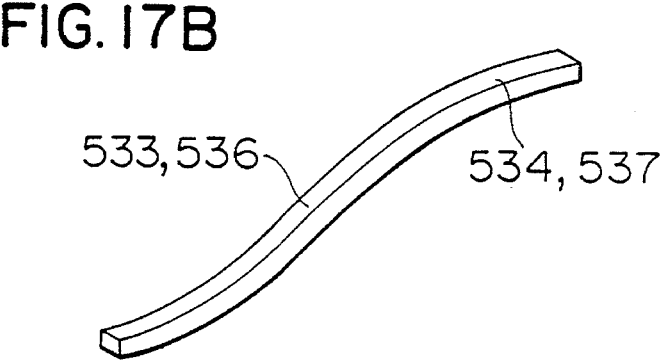
Figure 17C:
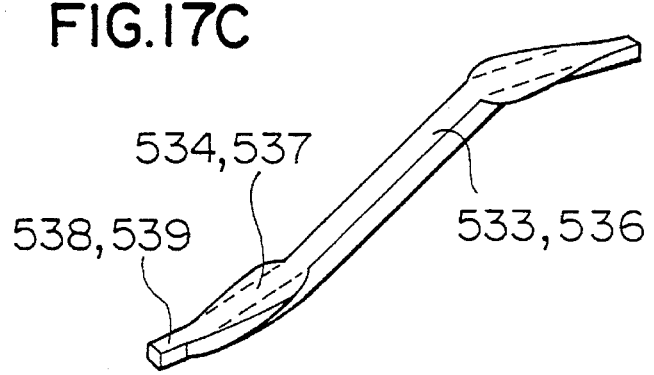
Figure 17D:
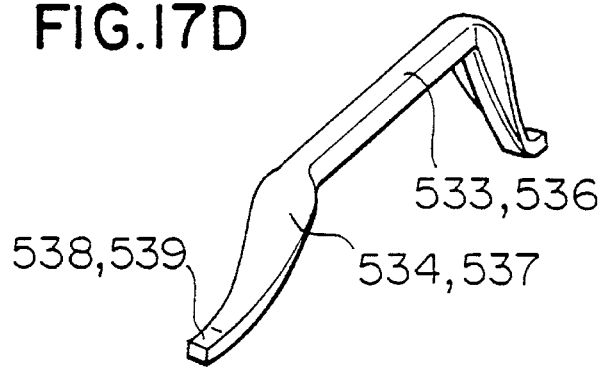

In the embodiment illustrated in FIGS. 17A through 17D, first, wire material 100 made of a good conductor, such as copper, is cut to the specified length as shown in FIG. 17A. Second, as illustrated in FIG. 17B, the portions corresponding to coil arms 534 and 537 are bent to the specified angles in the longitudinal direction. Third, as illustrated in FIG. 17C, coil arms 534 and 537 are shaped into a wide trapezoid and upper inner extension portion 538 and lower inner extension portion 539 are shaped into narrow protrusions, respectively. Coil arms 534 and 537 are pressed to spread the side portions in the width direction to be wider near coil trunks 533 and 536 and narrower near the extension portions. Extension portions 538 and 539 are drawn in the longitudinal direction to be narrow. Last, as illustrated in FIG. 17D, coil arms 534 and 537 are bent at right angles to coil trunks 533 and 536 respectively, and extension portions 538 and 539 are also bent at right angles to coil arms 534 and 537 respectively. This completes the whole procedure. Here, as coil arms 534 and 537 are formed to be thinner towards coil trunks 533 and 536, the stress caused by bending does not reach there, whereby the commutator face can be as widely and effectively obtained as the embodiment illustrated in FIG. 16. In addition, as coil arms 534 and 537 are formed by press machining to be wide, coil arms 534 and 537 are hard enough to be used as they are as contact faces for metal brush 910. Further, there is no need to widen the portions of upper coil arms 534 and lower coil arms 537 that do not contact metal brush 910 as illustrated in FIG. 17D. Also, it is advisable that upper coil trunk 533 and upper coil arm 534 be made of a good conductor with Vickers hardness of 55 or more. The Vickers hardness of copper that is normally 50 can be raised to be 55 or more by press machining.

Figure 18:
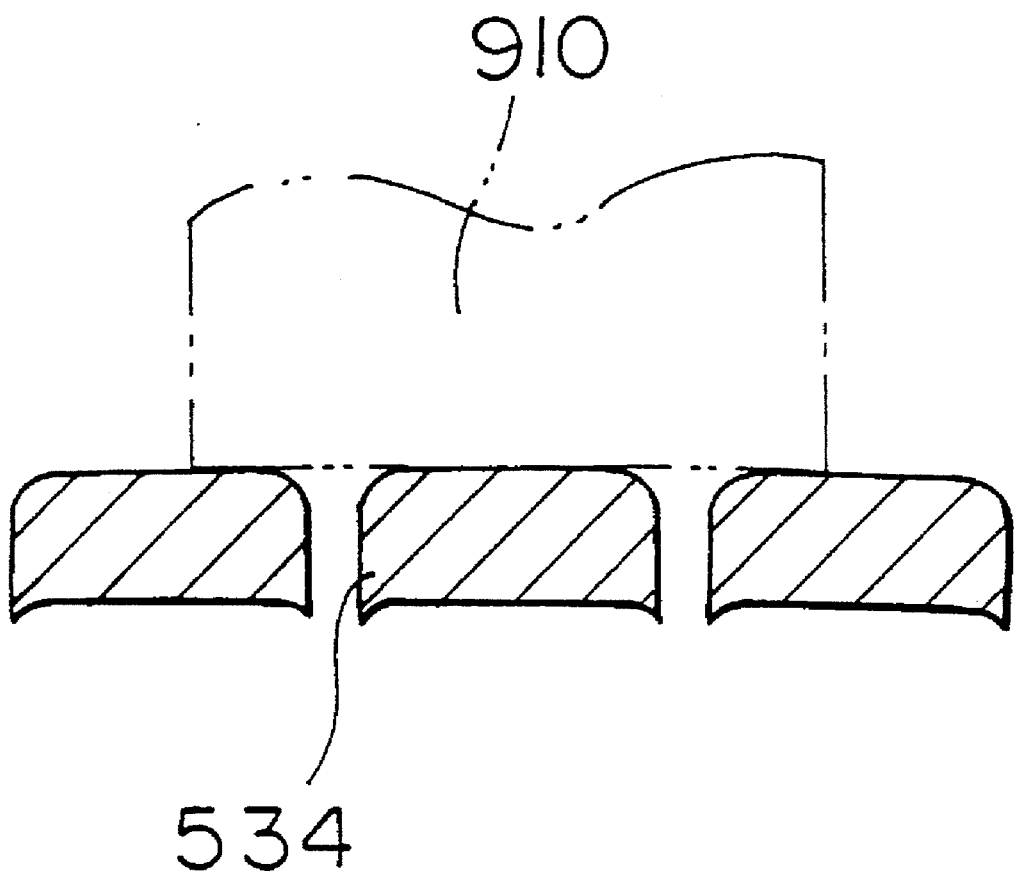
FIG. 18 is a cross-sectional view illustrating the positional relation between the upper coil arm and the metal brush.

Furthermore, as illustrated in FIG. 18, by using the shear droop side (i.e., side with no flash) made by press machining as the face of upper coil arm 534 to be contacted by metal brush 910, the edge portions of upper coil arm 534 are rounded, whereby the slidability of metal brush 910 is improved.

Figure 19:
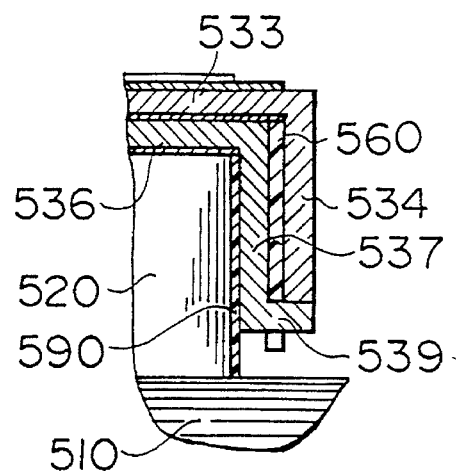
FIG. 19 is a cross-sectional view illustrating another connecting method for the upper and lower coil arms.
Figure 20:
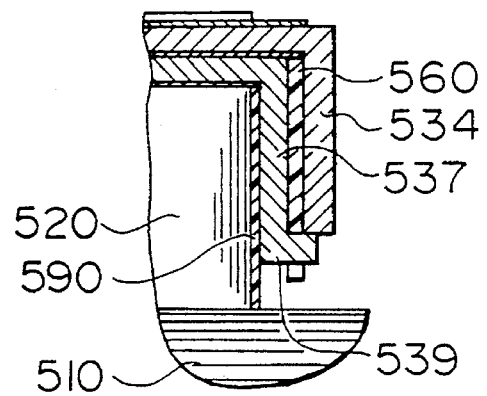
FIG. 20 is a cross-sectional view illustrating still another connecting method for the upper and lower coil arms.
Figure 21:
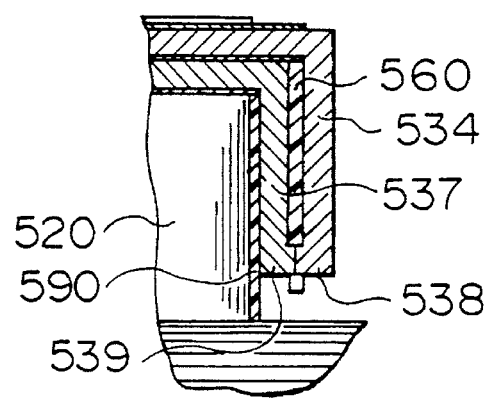
FIG. 21 is a cross-sectional view illustrating still another connecting method for the upper and lower coil arms.

FIGS. 19 through 21 illustrate other embodiments of the connection between upper coil arm 534 and lower coil arm 537.

In FIG. 19, upper inner extension portion 538 is not formed at one end of upper coil arm 534, and lower inner extension portion 539 of lower coil arm 537 is extended at most to the surface of upper coil arm 534. Accordingly, upper inner extension portion 538 of upper coil arm 534 can be eliminated, whereby the processing cost of upper coil bar 531 can be reduced.

As illustrated in FIG. 20, it is also acceptable that lower inner extension portion 539 of lower coil arm 537 be shorter than that of the type illustrated in FIG. 19 and connected to a part of the end face of upper coil arm 534. As an effect of this arrangement, lower inner extension portion 539 can easily be joined to upper coil arm 534.

As illustrated in FIG. 21, it is also acceptable that short inner extension portions 538 and 539 extend from upper coil arm 534 and lower coil arm 537, respectively, and join to each other. In this arrangement, as the extension portions 538 and 539 can be short, the processing thereof can be easy.

By using a liquid resin or a thin adhesive sheet for insulating spacer 560 and insulating ring 590, the small clearances between upper coil arm 534 and lower coil arm 537 and between lower coil arm 537 and armature core 520 can be eliminated. As a result, the heat conductivity can further be improved, and the micromotion of the coil arms 534 and 537 can be prevented.

Furthermore, by applying an insulating coating to upper and lower coil trunks 533 and 536 and coil arms 534 and 537, upper and lower insulating films 540 and 541 can be eliminated. As a result, parts otherwise required, such as insulating spacer 560, are not needed.

Figure 22:
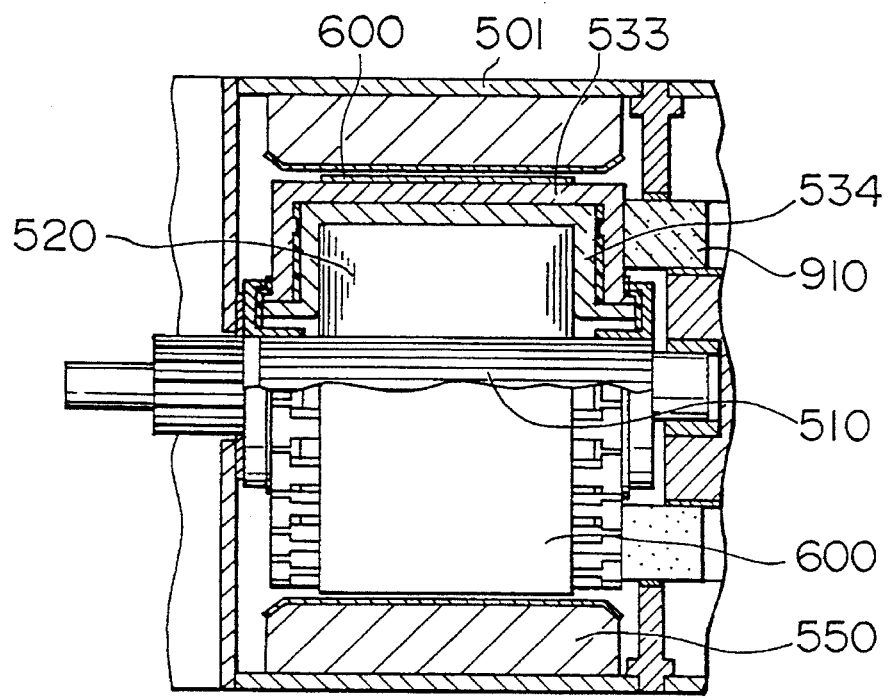
FIG. 22 is an axial cross-sectional view illustrating the rotor of the electric rotating machine according to a second embodiment of the present invention.

The second embodiment of the present invention is depicted in FIG. 22. In the second embodiment, open slots are adopted as slots 524 of armature core 520. After armature coils 530 are fit in slots 524, thin non-magnetic cylinder 600 is mounted on the outer periphery of armature core 520 to prevent the projection of armature coils 530 in the radial direction. In this arrangement, the outer periphery of armature core 520 is so smooth that the windage loss during the rotation of the armature can be reduced and the wind noise can be reduced, resulting in a low-noise operation. Accordingly, this embodiment is suitable for use as a high speed electric rotating machine.

Figure 23:
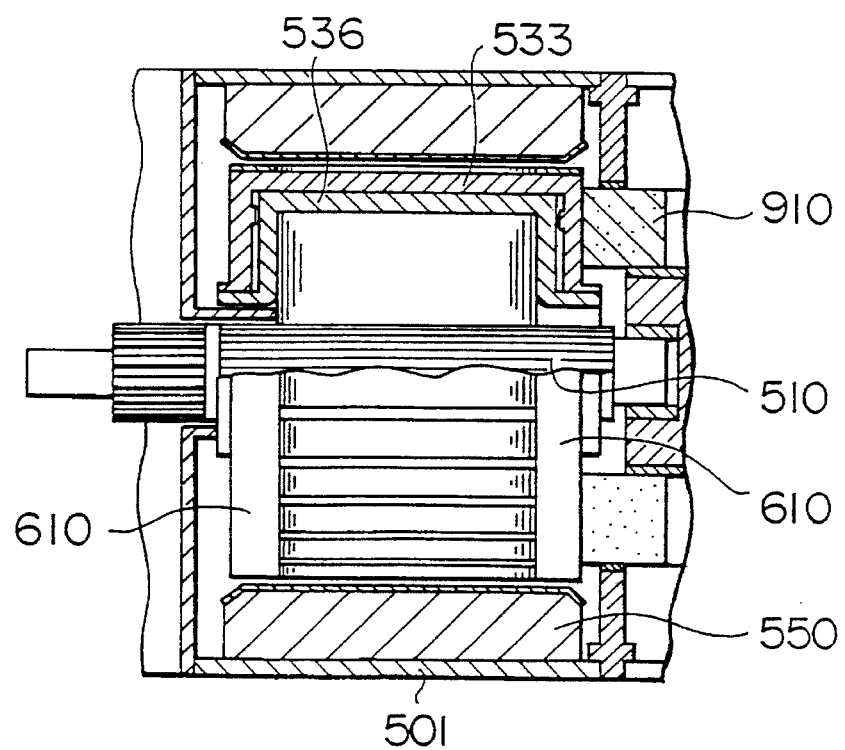
FIG. 23 is an axial cross-sectional view illustrating the rotor of the electric rotating machine according to a third embodiment of the present invention.

The third embodiment of the present invention is depicted in FIG. 23. In the third embodiment, both axial end sides of the upper coil trunk 533, i.e., the outer peripheral portions axially apart from armature core 520, are blocked by thin non-magnetic cylinders 610. In this arrangement, fixing members 570 as used in the first embodiment are unnecessary. Accordingly, a larger area towards the inner periphery can be used as the sliding surface for metal brush 910, and metal brush 910 can have a larger cross sectional area. As a result, the electric rotating machine can have a higher output and a longer service life.

Figure 24:
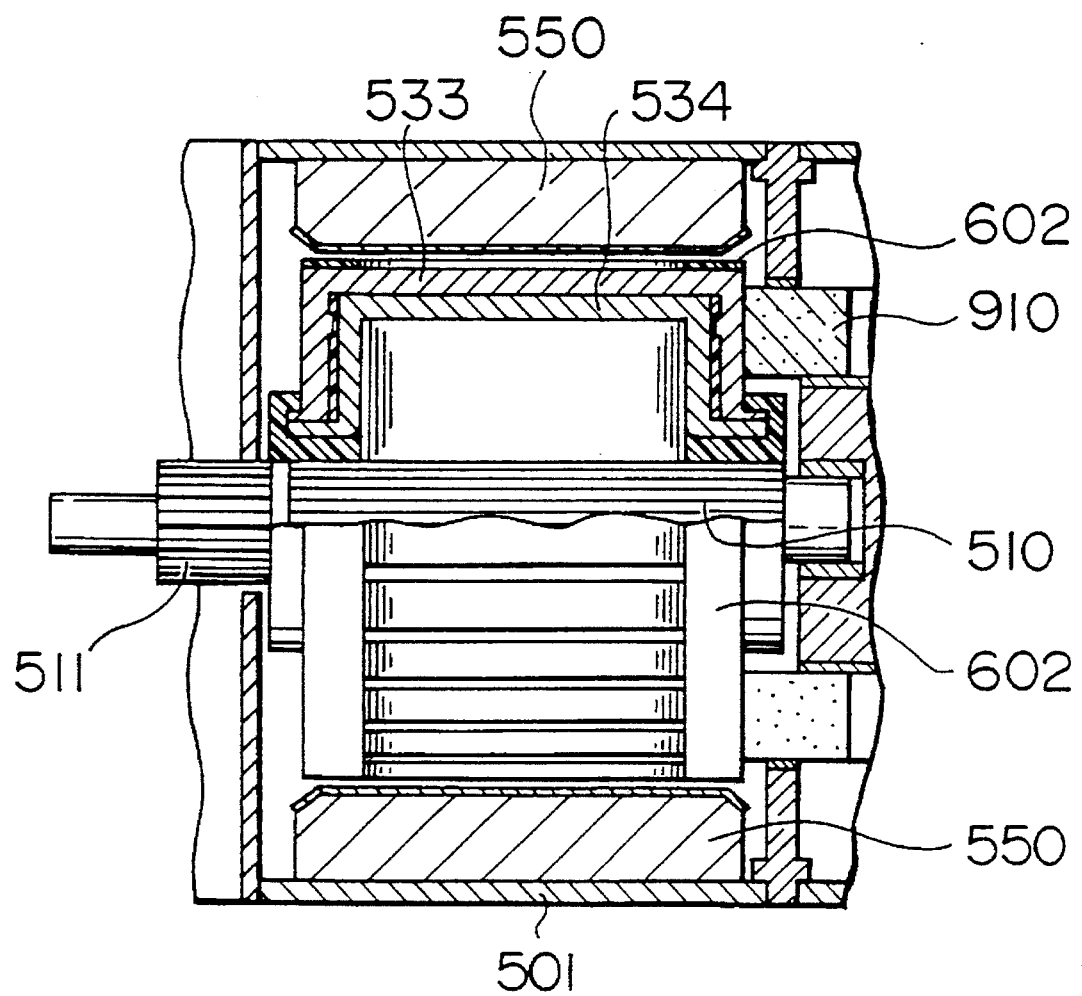
FIG. 24 is an axial cross-sectional view illustrating the rotor of the electric rotating machine according to a fourth embodiment of the present invention.

The fourth embodiment of the present invention is shown in FIG. 24. In the fourth embodiment, all the components including armature core 520 and upper coil trunk 533 are integrally molded with molded resin 602.

Figure 25:
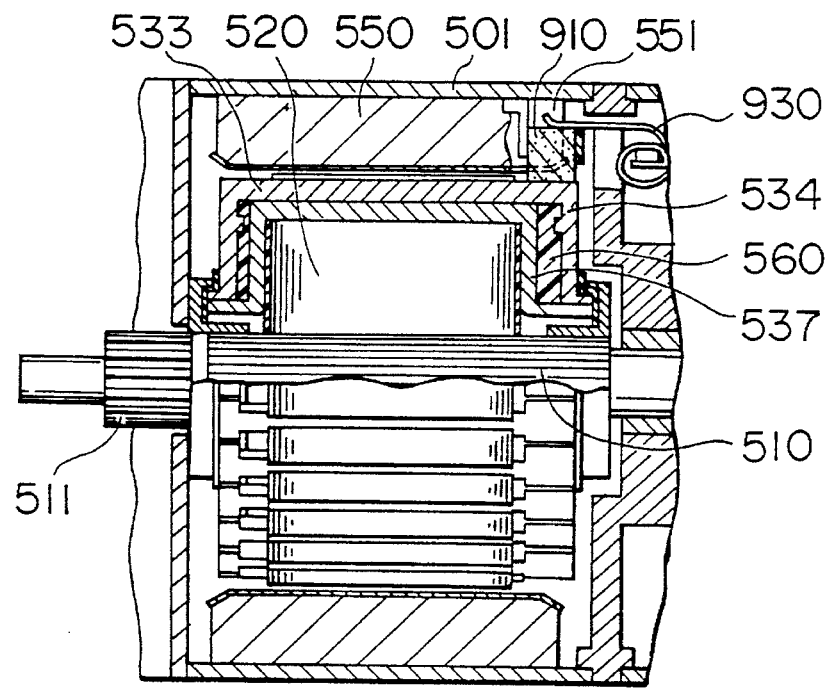
FIG. 25 is an axial cross-sectional view illustrating the rotor of the electric rotating machine according to a fifth embodiment of the present invention.

In the fifth embodiment illustrated in FIG. 25, upper coil trunk 533 extends in the axial direction by the thickness of metal brush 910 to slidably hold metal brush 910 on the outer periphery of the end part of upper coil trunk 533. A leaf spring is used as metal brush spring 930. In extending upper coil trunk 533 in the axial direction, insulating spacer 560 having a large thickness is used.

In addition, by forming spaces 551 between fixed magnets 550 and disposing metal brush 910 in spaces 551, the space for housing metal brush 910 can be secured, and at the same time, the overall axial length of the electric rotating machine can further be shortened.

Figure 26:
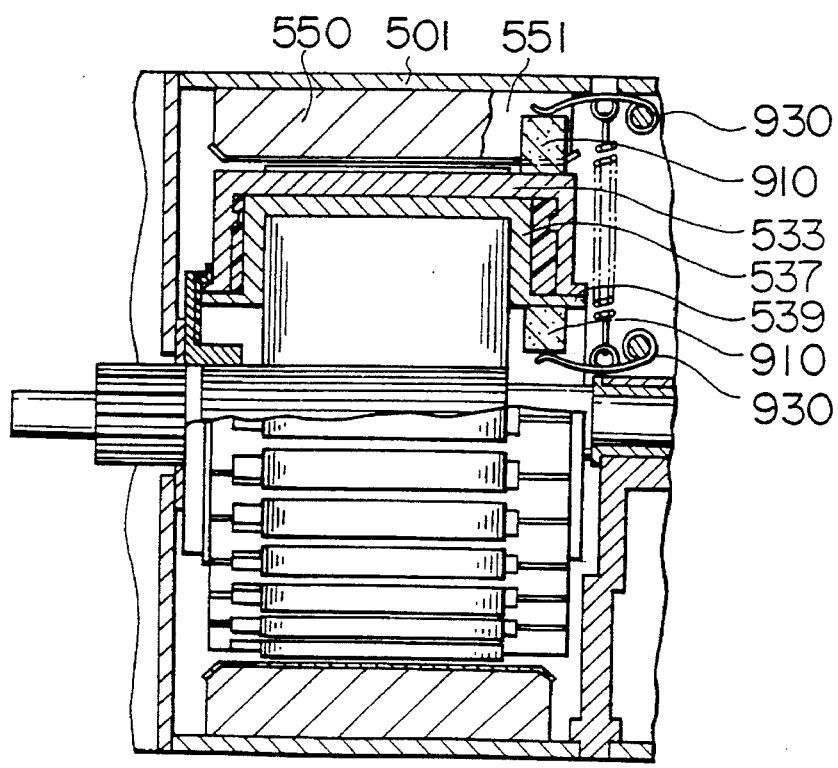
FIG. 26 is an axial cross-sectional view illustrating the rotor of the electric rotating machine according to a sixth embodiment of the present invention.

In the sixth embodiment illustrated in FIG. 26, metal brush 910 at one side is disposed on the outer periphery of the end part of upper coil trunks 533 as in the fifth embodiment, and metal brush 910 at the other side is disposed so as to slide on the inner periphery of lower inner extension portion 539 of lower coil arm 537. Metal brushes 910 at both sides are forced against coil trunk 533 and extension portion 539, respectively, by the spring forces of the leaf springs 930. In this arrangement, the inner peripheral space of lower inner extension portion 539 of lower coil arm 537 is utilized for housing metal brush 910 on the other side, whereby the overall axial length of the electric rotating machine can further be shortened.

In the sixth embodiment, it is also acceptable that upper coil arm 534 be provided with an extension portion protruding towards lower coil arm 537 instead of lower extension portion 539 of lower coil arm 537, with metal brush 910 sliding on the extension portion from upper coil arm 534 rather than on lower extension portion 539.

It is to be noted that, in the first six embodiments, the description of upper coil arm 534 and lower coil arm 537 being roughly parallel to the end face of armature core 520 means that the angle formed between the upper and lower coil arms 534 and 537 and the end face of armature core 520 is 45 degrees at most.

In addition, in the embodiments of the electric rotating machine according to the present invention, two coil trucks are housed within the slot 524. It is also acceptable that any even number of coils, such as four coils, are used.

Figure 27:
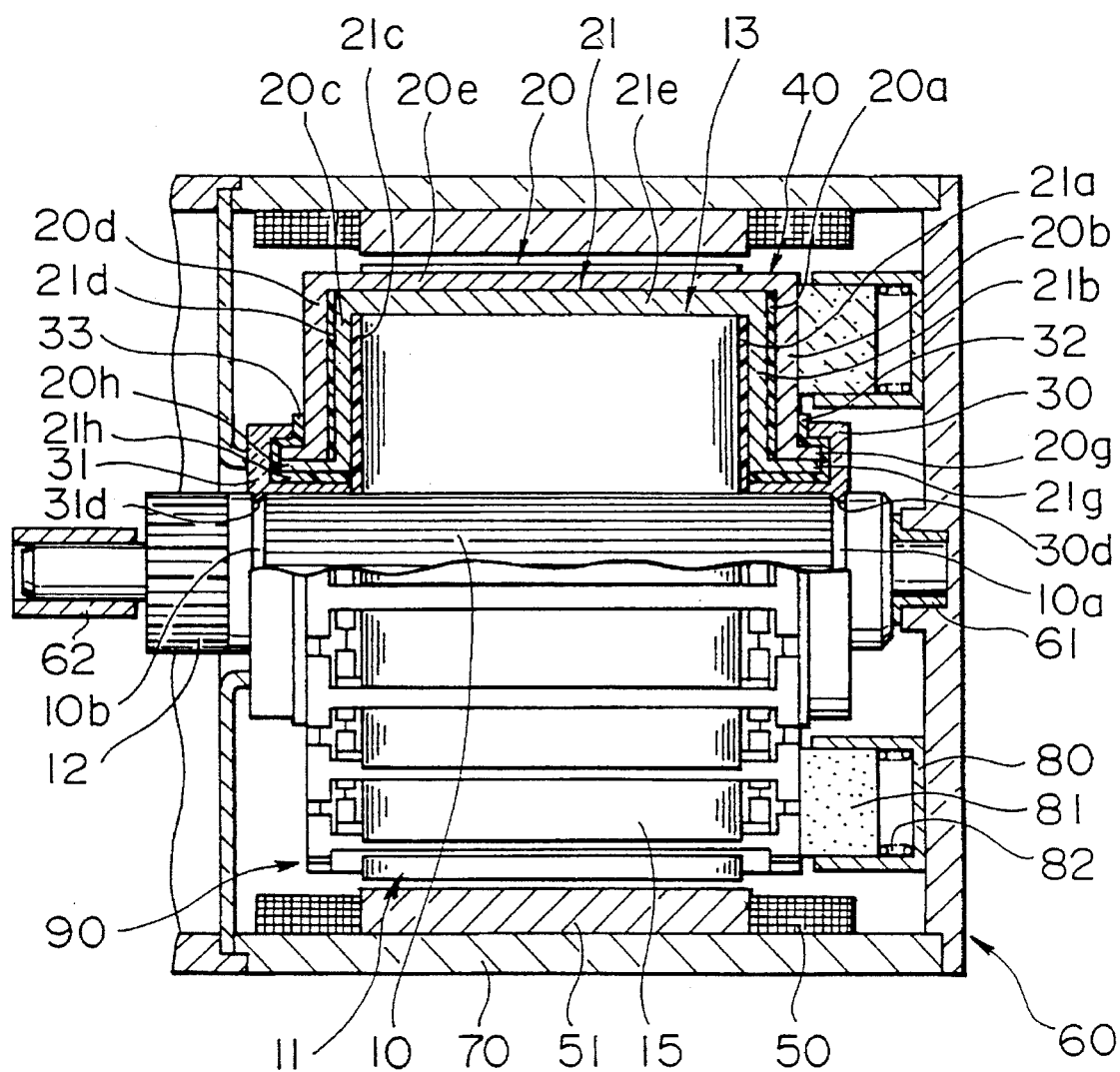
FIG. 27 is an axial cross-sectional view illustrating a seventh embodiment of this invention.
Figure 28A:
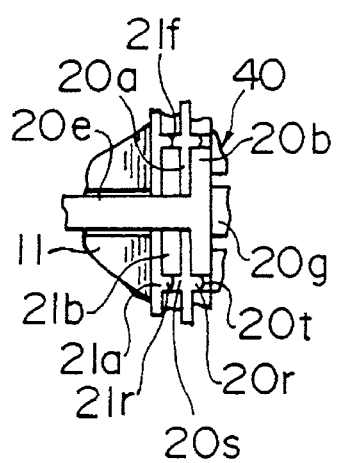
FIG. 28A is an enlarged plan view of a part of the seventh embodiment.
Figure 28B:
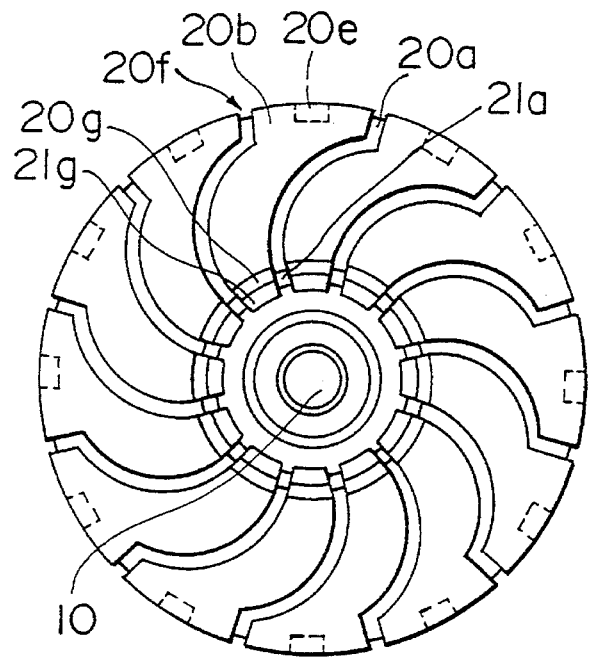
FIG. 28B is a side view of the axial side end of the armature coil on the commutator side of seventh embodiment in FIG. 27.

FIG. 27 shows the axial cross-sectional view of the electric rotary machine according to the seventh embodiment of this invention. FIG. 28A and 28B are enlarged cross sections in the axial direction of the commutator portion.

In the approximate center of rotary shaft 10, the armature core 11 formed by layering multiple disc-shaped steel plates 15 is fit. Multiple slots 13 extending axially are formed on the circumference of the armature core 11, and armature coils 20e and 21e, also called conductors, are fit in the upper and lower layers. Numeral 20e is a trunk of the outer or upper conductor 20, and 21e is a trunk of the inner or lower conductor 21.

The commutator portion 40, which is made up by the outer conductor 20, is formed on the axial rear (right) end of armature core 11. On the front (left) end, the non-commutator portion 90, described later, is formed, thus configuring the armature (rotor) of the electric rotating machine. Both axial ends of rotary shaft 10 are supported by bearing 61 installed on end frame 60 of the electric rotating machine and bearing 62 installed on the members not shown in the drawing. End frame 60 blocks the opening of the yoke 70 made of cylindrical steel plates. In the inner circumference of the yoke 70, four magnetic cores 51 onto which field coils 50 are wound are fixed near the periphery of the armature core 11. Each of these coils is fixed so that they are separated 90 in the circumferential direction. The yokes 70, field coils 50 and magnetic cores 51 constitute a stator. Gears 12 are installed on rotary shaft 10. These gears are engaged with the gears of a reduction gear mechanism (such as the epicycle reduction gear mechanism) not shown in the figure. The rotation of rotary shaft 10 is conveyed to the gears not shown in the figure.

Brush holder 80 is fixed onto end frame 60, and brush 81 is held inside so that it can freely slide in the axial direction. Brush 81 is pressed against first armature coil holding portion or upper arm 20b of commutator portion 40, described later, by spring 82 in brush holder 80.

Commutator portion 40, non-commutator portion 90, armature coil 20e and armature coil 21e are explained in detail hereinunder.

Third armature coil holding portion or lower arm 21b is arranged on the right side end of armature core 11 with insulation material 21a. First armature coil holding portion 20b is arranged on the surface with insulation material 20a. Fourth armature coil holding portion or lower arm 21d is arranged on the right side end of armature core 11 with insulation material 21c. Second armature coil holding portion or upper arm 20d is arranged on the surface with insulation material 20c. Insulation material 21a, third armature coil holding portion 21b, insulation material 20a and first armature coil holding portion 20b constitute commutator portion (brush side) 40. Insulation material 21c, fourth armature coil holding portion 21d, insulation material 20c and second armature coil holding portion 20d constitute noncommutator portion (opposing brush side) 90.

Conductor 20e, first armature coil holding portion 20b and second armature coil holding portion 20d are made of copper, etc., and are integrally formed with cold casting, etc., to create outer conductor 20. Furthermore, conductor 21e, third armature coil holding portion 21b, and fourth armature coil holding portion 21d are made of copper, etc., and are integrally formed with cold casting, etc., to create inner conductor 21.

The arrangement of armature coil holding portions 20b and 21b on the commutator side is shown in FIGS. 28a and 28B.

Insulation materials 20a and 21a are sandwiched between armature coil holding portions 20b and 21b and between armature coil holding portion 21b and armature core 11. Insulation materials 20a and 21a have holding plate separator wall portions 20r, 20s and 21r that protrude to commutator plate (armature coil holding portion) 20b that neighbors circumferentially, the curvy long-slot clearance or groove 20f between tow holding portions 20b, and to the holding plate (armature coil holding portion) 21b, and the curvy long-slot clearance 21f. The protrusion amount of the holding plate separator wall portion 20r is less than the shaft-wise direction thickness of the armature coil holding portion 20b. When the space or groove 20f is seen from the armature radial direction (refer to FIG. 28A), space 20t is formed at the end of the holding plate separator wall portion 20r, and that the space 20t is an undercut of the commutator.

Armature coil holding portions 20d and 21d and insulation materials 20c and 21c on the non-commutator side have the same type of form and arrangement as the armature coil holding portion 20b and 21b and insulation materials 20a and 21a on the commutator side. The space on the non-commutator portion that corresponds to space 20t acts as the fan that generates the centrifugal wind during rotation of the armature.

Figure 30:
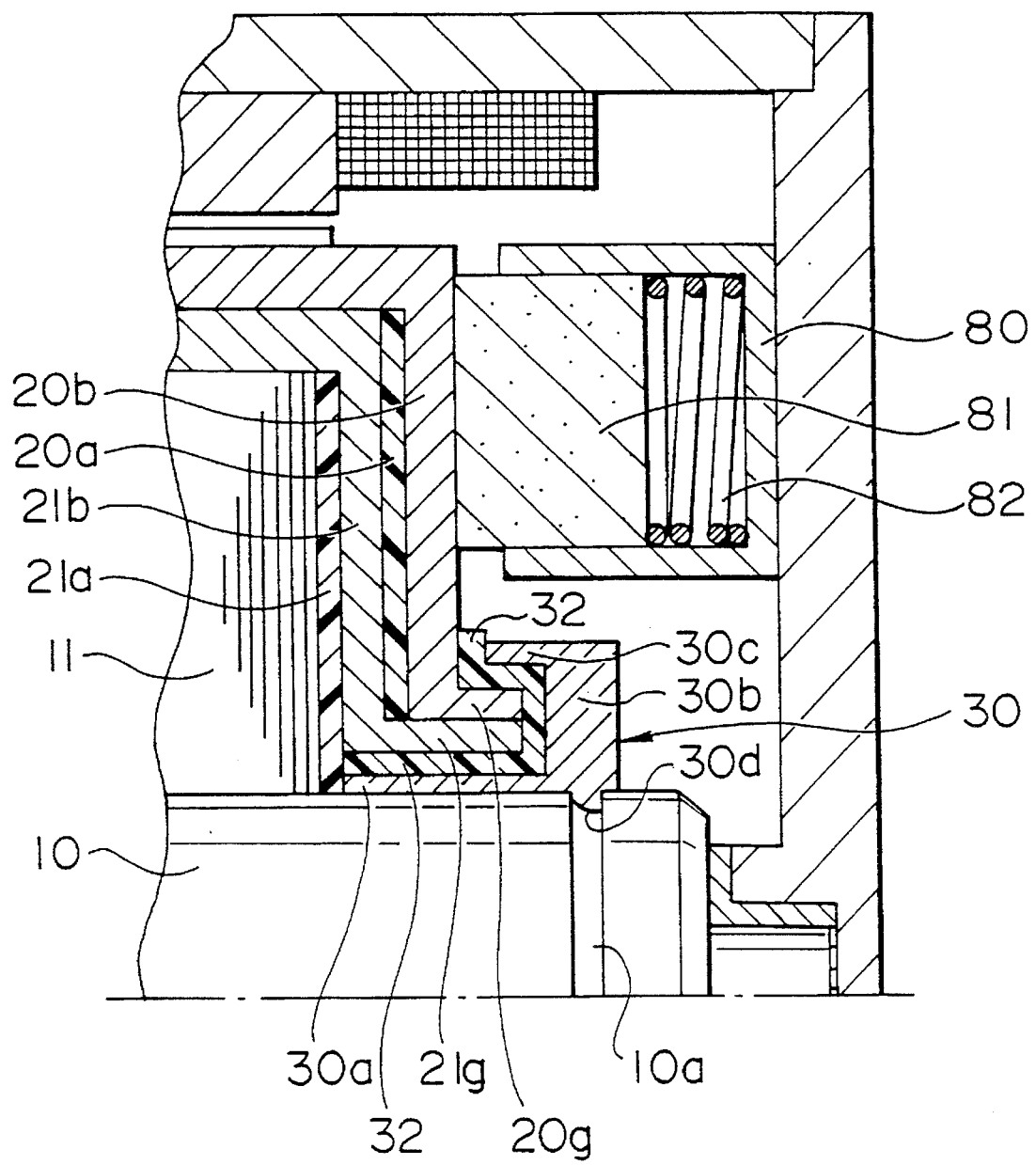
FIG. 30 is an enlarged axial cross-sectional view of the seventh embodiment shown in FIG. 27.

Furthermore, as shown in FIGS. 27 and 30, protrusions 20g, 21g, 20h and 21h that protrude in the direction opposite from armature core 11 are set on the inside diameter ends of the armature coil holding portions 20b, 21b, 20d and 21d. In other words, protrusion 20g protrudes in the axial direction from holding portion 20b, protrusion 21g from holding portion 21b, protrusion 20h from holding portion 20d, and protrusion 21h from holding portion 21d. The collar 30 fixed on the rotary shaft 10 directly contacts the circumference of protrusion portion 20g via insulation material 32. In the same manner, collar 31 fixed on rotary shaft 10 directly contacts the outer circumference of protrusion portion 20h via the insulation material 33.

Next, method of assembling the armature coil in this embodiment is explained.

Insulation film or insulation material sheet is sprayed, baked, wound, or stuck with adhesive onto the surface of conductor 20e beforehand. Insulation film or insulation material sheet is also applied on the surface of conductor 21e in the same method as for conductor 20e.

First conductor 21e and then conductor 20e are inserted into slot 13 of armature core 11. At this time, armature core's right side plain washer type insulation material 20a, armature coil holding portion 20b, insulation material 21a and .armature coil holding portion 21e are arranged as explained above. When both conductors 20e and 21e have been inserted into all slots 13, both protrusion portions 20g and 21g are connected by welding, etc., and then both protrusion portions 20h and 21h are connected by welding, etc.

After connecting, pressure to press-in and compress the outer armature coil holding portions 20b and 20d towards the axial direction of each armature is applied. The insulation materials 20a, 20c, 21a and 21c are deformed. The protruding portions, the holding plate separator wall portions 20r, 20s and 21 shown in FIG. 28, are formed into the narrow clearances created when the insulation materials 20a, 20c, 21a and 21c neighbor circumferentially toward the commutator side and non-commutator side. If the insulation materials 21a and 21c are formed to protrude into slot 13 of part of the armature core 11 at this time, the conductor and core insulation will be further rigid.

Thus, electrical insulation resin material that deforms under adequate compression pressure is most suitable for the insulation materials 21a and 21c.

At the same time, collars 30 and 31 and insulation materials 32 and 33 are fit from the left and right onto the rotary shaft 10 shown in FIG. 27. Collar 30 and protrusions 20g and 21g are assembled to directly contact via insulation material 32, and collar 31 and protrusions 20h and 21h are assembled to directly contact via insulation material 33. Collars 30 and 31 deform in plasticity due to this fitting force, and resin 30d protrudes to the ring groove 10a to restrict displacement of collars 30 and 31.

If collars 31 and 32 are pressed and compressed toward the armature core axial side after assembly, holding portions 20b, 21b, 20d and 21d of both conductors 20 and 21 will be rigidly pressed against the core 11, and insulation materials 20a, 21a, 20c and 21c will also be rigidly fixed. With the pressing and compressing of the collars 30 and 31, the protrusion 30d and 31d corresponding to the ring grooves 10a and 10b on the circumference of rotary axis will be rigidly fixed to the inside diameter of collars 31 and 33, and the fixing of the raised and formed collars 30 and 31 to the rotary shaft 10 will also be rigid. If the end of the inner cylinder of collars 30 and 31 are directly contacted against core 11, the core 11 can be fixed onto the rotary shaft via collars 30 and 31.

The circumference of the axial protrusions 20g and 20h of the outer conductor 20 fits with each collar 30 and 31 as explained above when collars 30 and 31 have been assembled so the rising of the conductors 20 and 21 in the radial direction due to centrifugal force during rotation of the armature can be prevented.

Figure 29:
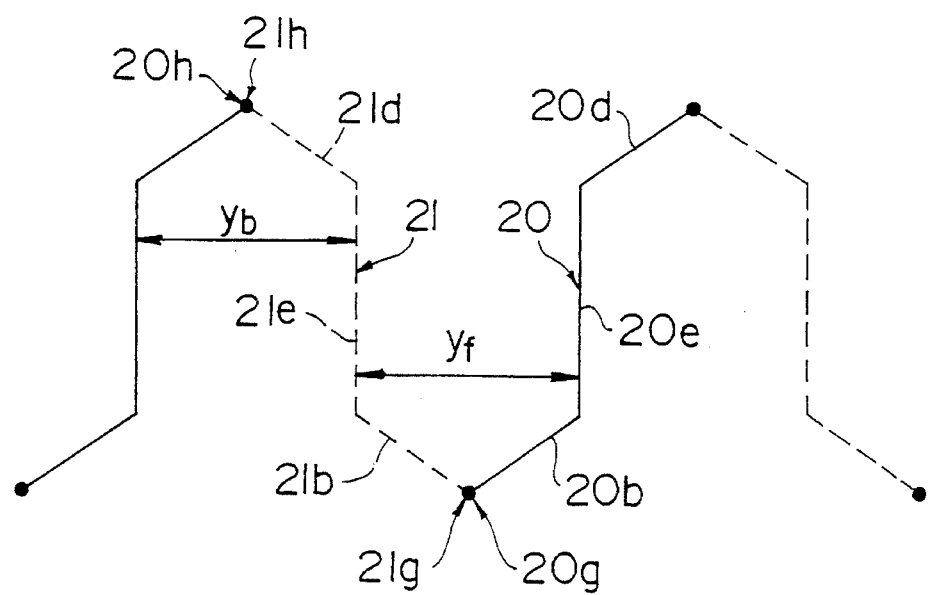
FIG. 29 is a partial wiring diagram of an inner conductor and an outer conductor shown in FIG. 27.

An electrical connection diagram for an embodiment of the armature coils (conductors) 20e and 21e and the armature coil holding portions 20b, 21b, 20d and 21d in this invention is shown in FIG. 29.

As is clear with the above explanation, with this embodiment, it is assumed that the coil ends of the armature coil are converted into the third armature coil holding portion 21b of the inner conductor 21, so the axial length of the armature can be reduced, and the motor size and weight can be reduced. Furthermore, as the centrifugal force is applied in the parallel direction onto the contact boundary surface of the resin insulation materials 21a and 20a, third armature coil holding portion 21b and first armature coil holding portion 20b, the anti-centrifugal force properties of the commutator portion 40 can be improved. Furthermore, an increase in the sliding surface area with the brush 81 has been realized. The resistance heat and frictional heat generated at the first armature coil holding portion 20d are favorably cooled by the centrifugal wind flow thus generated. The heat is also absorbed by the large heat capacity armature core 11 with solid heat transfer, allowing this structure to be applied to motors for fully-closed starter/motors. The effect is especially remarkable for reducing the size and increasing the rotation speed with the incorporation of the reduction gear mechanism.

In addition, according to this embodiment, all parts excluding the rotary shaft 10 can be produced with high productivity pressing and cold casting. The only machining required for the entire armature is pressing and welding. This is an area that conventionally required a large amount of machining time. Cutting required conventionally for forming the undercut between the commutator parts has been eliminated in this embodiment, as the undercut portion is formed when the armature coil 20 is assembled to armature core 11. Bothersome conventional commutator mold formation is substituted for in this embodiment as the armature coil holding portions 20b and 20d are pressed in toward the armature core 11, and the insulation materials 20a and 20c arranged in the inner side of holding portions 20b and 20d are partially raised into the narrow clearances 20f between the armature coil holding portions 20b that neighbor circumferentially, and into the narrow clearances between armature coil holding portions 20d that neighbor circumferentially.

With the conventional armature, the armature coil had to be fit into the armature core slots, requiring processes such as impregnating the slots with resin. However, with this embodiment, the armature coil can be rigidly fit to the armature core with a very simple process by fitting the protrusion portions 20g, 21g, 20h and 21h on the armature coils 20 and 21 with the collars 30 and 31. Thus, the conventional resin impregnation can be omitted.

The insulation materials 20a, 21a, 20c and 21c are formed with an insulation matter having an adequate plasticity such as paper or resin sheets, etc. Insulation matter such as solid epoxy resin is used for the insulation materials 20a, 21a, 20c and 21c. After assembling the conductor and forming the protrusion portions 20r, 20s and 21r, etc., the material can be hardened by heating, etc. Furthermore, after the conductor is assembled, the expansion portions 20r, 20s and 21r of the insulation materials 20a, 21a, 20c and 21c are formed by pressing in the armature coil holding portions 20b, 21b, 20d and 21d in the above embodiment. However, the expansion portions 20r, 20s and 21r can be each formed for insulation materials 20a, 21a, 20c and 21c beforehand. In this case, resin material with an outstanding insulation property and strength such as phenol resin can be used for the insulation materials 20a, 21a, 20c and 21c.

In the eighth embodiment, the other connection structure of the protrusion portions 20g and 21g of the first armature coil holding portion 20b and third armature coil holding portion 21b is modified from the seventh embodiment.

Figure 31A:
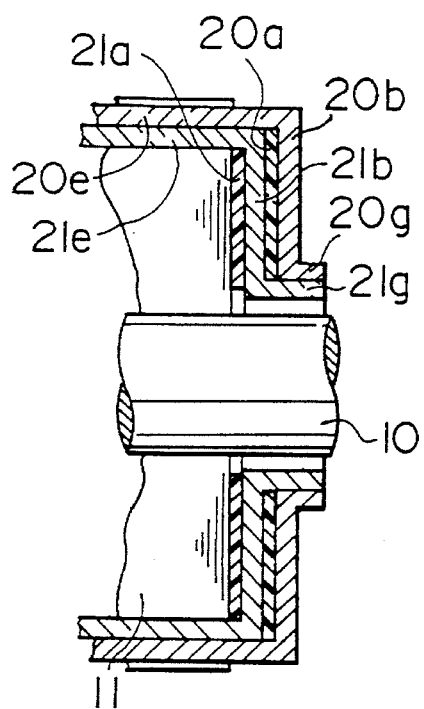
Figure 31B:
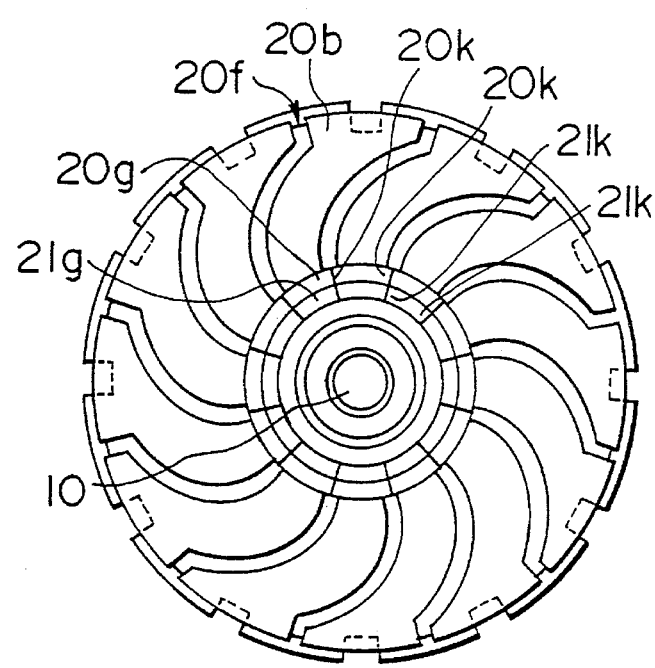
Figure 31C:
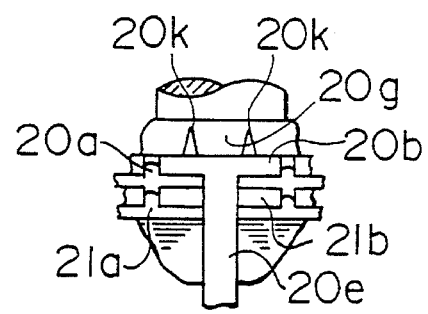

FIGS. 31A through 31C show the state before the protrusion portions 20g and 21g of the first armature coil holding portion 20b and third armature coil holding portion 21b are connected.

The circumferentially widened portion 20k is formed on the axial end of protrusion portion 20g. The circumferentially widened portion 21k is also formed on the axial end of protrusion portion 21g.

In this embodiment, armature coil 20e integrated with the first armature coil holding portion 20b of slot 13 on the armature core 11 is inserted into the outside diameter portion of the first armature coil holding portion 20b and positioned circumferentially. At the inside diameter portion, the circumferentially widened portions 20k of the axial end of protrusion portion 20g integrated with armature coil holding portion 20b are positioned circumferentially so that they are mutually neighboring and contacting circumferentially. As a result, each first armature coil holding portion 20b is arranged uniformly in the circumferential direction.

Furthermore, the armature coil 21e integrated with the third armature coil holding portion 21b of slot 13 on the armature core 11 is inserted into the outside diameter portion of the third armature coil holding portion 21b and positioned circumferentially. At the inside diameter portion, the circumferentially widened portions 21k of the axial end of protrusion portion 21g integrated with armature coil holding portion 21b are positioned circumferentially so that they are mutually neighboring and contacting circumferentially. As a result, each third armature coil holding portion 21b is arranged uniformly in the circumferential direction.

The widths of the protrusion portion 20g axial end circumferentially widened portion 20k and the protrusion portion 21g axial end circumferentially widened portion 21k is arranged so that the circumferential width center is approximately aligned.

The arrangement state before the protrusion portions 20h and 21b in the second armature coil holding portion 20d and fourth armature coil holding portion 21d is the same as that explained above.

Figure 32A:
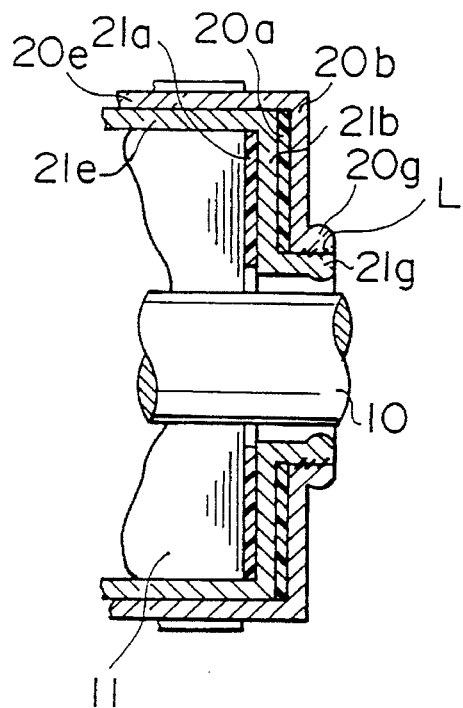
FIG. 32A is an axial-cross sectional view illustrating the state after the armature coil holding portions and are welded in the eighth embodiment.
Figure 32B:
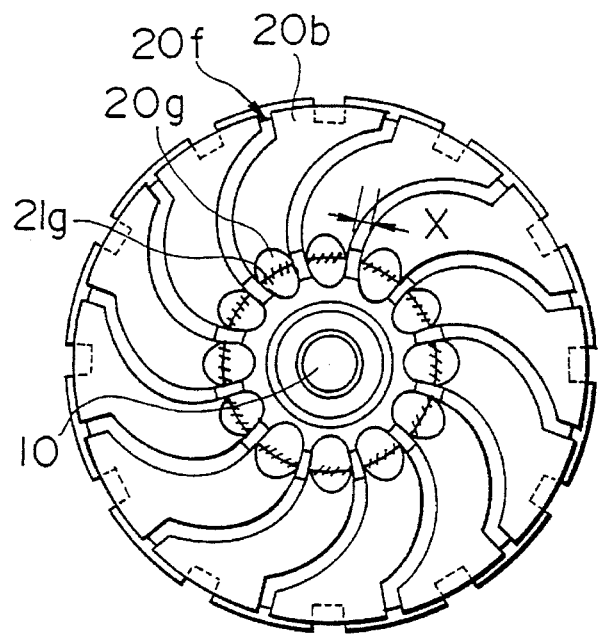
FIG. 32B is an axial front view of the same.
Figure 32C:
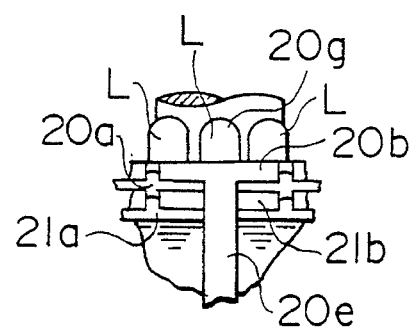
FIG. 32C is an enlarged plan view illustrating the protrusion portion.

FIG. 32 shows the state with the protrusions 20g and 21g of the first armature coil holding portion 20b and third armature coil holding portion 21b welded.

When the circumferentially widened portions 20k and 21k that are the axial ends of protrusion portions 20g and 21g are melted with TIG welding, etc., the melted end changes into a near-spherical shape due to its own surface tension. The radial dimensions increase and the width dimensions in the circumferential direction decrease. In other words, the shape changes from the original circumferentially widened portions 20k and 21k in which the circumferential direction was wider than the radial direction into a spherical shape. The shape hardens to create the spherical contact portion L.

Thus, since the circumferentially widened portions 20k and 21k of the protrusion 20g and 21g have been shaped into the spherical contact portion L, the circumferential width of the circumferentially widened portions 20k and 21k have decreased. Thus, the circumferential clearance x is accurately created between each protrusion portion 20g and 21g that neighbor circumferentially.

In other words, while the first armature coil holding portion 20b and third armature coil holding portion 21b contact, a clearance is accurately created circumferentially between the neighboring first armature coil holding portions 21b and neighboring third armature coil holding portions 21b.

On the end of the armature core 11 that is opposite from that above, a spherical contact portion is formed with welding for melting the circumference winding portion of protrusions 20h and 21h as with the third armature coil holding portion, and thus the same effect can be achieved.

The narrow clearances 20f formed between the first armature coil holding portions 20b that neighbor circumferentially due to the above connections become the undercut for the commutator.

In this embodiment, the protrusion portions 20g and 21g gradually widen circumferentially toward the axial opposing armature core as shown in FIG. 31C. Only each end on the axial opposing armature core contact each other. In other words, the circumference widened portions 20k and 21k are formed almost only at the end of the protrusion portions 20g and 21g. Thus, when this portion is heated and melted, the protrusion portions 20g and 21g including each circumferentially widened portion 20k and 21k each become independent spherical contact portions, and the protrusion portions 20g and 21g that neighbor circumferentially are not integrally welded. Every other protrusion portion 20g and 21g in the circumferential direction can be welded at once, and then the remaining protrusion portions 20g and 21g can be welded at once.

Figure 33:
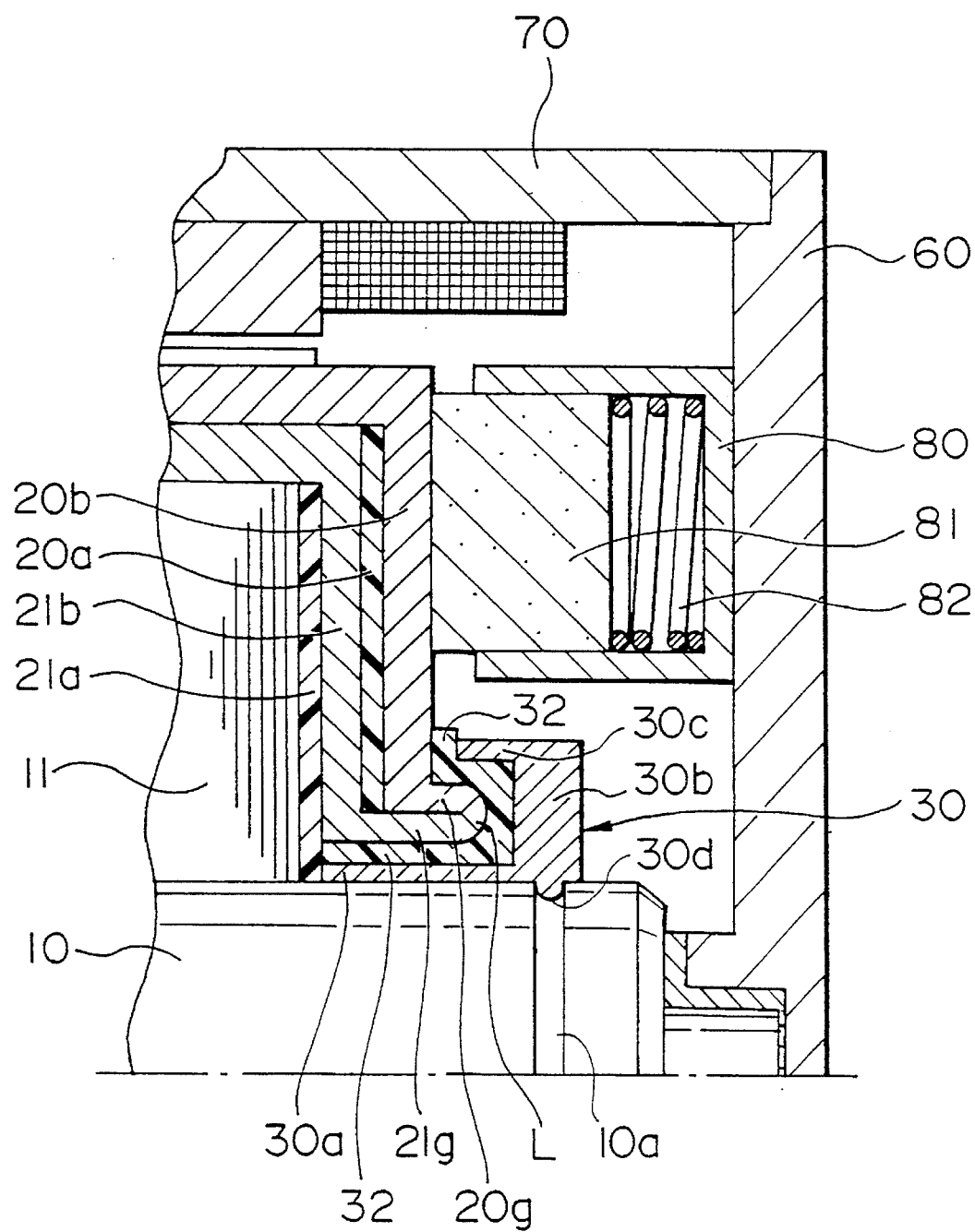
FIG. 33 is a partial enlarged axial cross-sectional view illustrating the fixed state of the collar.

Next, the collars 30 and 31 will be explained with reference to FIG. 33.

The collar 30 fixed onto the rotary shaft 10 directly contacts the spherical contact portion L of the protrusion portion 20g via insulation material 32. In the same manner, the collar 31 fixed to the rotary shaft 10 directly contacts the outer circumference of the protrusion portion 20h via the insulation material 33.

Collar 30 is a commutator fixing material made of soft metal such as aluminum. As shown in FIG. 33, the collar 30 is configured of the inner cylinder portion 30a fit onto the rotary shaft 10, the ring plate portion 30b that extends toward the outer radial direction from the base end portion of the inner cylinder portion 30a, and the outer cylinder portion 30c that extends from the ring plate portion 30b outside diameter end to the armature core 11. The expansion portion 30d that fits into the ring groove 10a on the rotary shaft 10 is formed on the inside diameter end of the ring plate portion 30b. Collar 31 has the same structure as collar 30.

In this eighth embodiment, outer conductor 20 and inner conductor 21 are engaged with the collar fit on the spherical contact portion, by that improving the anti-centrifugal force properties of the outer conductor 20 and inner conductor 21.

In addition, with conventional armatures, copper wires had to be wound into a designated shape, the coil ends had to be twisted, and the coil had to be connected to a designated position in the commutator while curving the coil. Instead of this complicated commutator coil that required accuracy, a simple work process in which the outer conductor 20 and inner conductor 21 have been integrally formed, and these are inserted into slots from the outside diameter side of the armature core 11 has been incorporated. In this insertion process, the armature coils 20e and 21e are automatically positioned circumferentially at the outside diameter portion of the conductors 20 and 21. At the inside diameter portion of the conductors 20 and 21, when the protrusion portions 20g, 20h, 21g and 21b are assembled to the neighboring phases, they are automatically positioned circumferentially when directly contacted. The direct contact of each circumferentially widened portion 20k and 21k of these protrusions 20g, 20h, 21g and 21h allows the circumferential width to be reduced and the circumferential clearance to be automatically formed when welded.

The conductors 20 and 21 are fixed in the diameter and axial directions by collars 30 and 31, so the armature coil does not need to be fixed to the armature core as with the conventional armature. Thus, the armature coil fixing process in which resin is impregnated into slots 13 is not longer required. However, this process can be added.

In addition to TIG welding, arc welding or laser beam welding can be used. The spherical contact portion L or protrusion portions 20g, 21g, 20h and 21h can be deformed with an external force before or after welding each armature coil holding portions 20b, 21b, 20d and 21d. If the strength and insulation properties of the armature coil insulation film are sufficient, part or all of the insulation materials 20a, 21a, 20c and 21c can be eliminated.

This invention has been described in connection with what are presently considered to be the most practical and preferred embodiments of the present invention. However, this invention is not meant to be limited to the disclosed embodiments, but rather is intended to cover various modifications and alternative arrangements included within the spirit and scope of the appended claims.

What is claimed is:

1. An electric rotating machine comprising:

an armature core including slots;

a shaft rotatably supporting said armature core;

upper coil trunks and lower coil trunks housed within said slots of said armature core;

first lower coil arms electrically connected at one end part thereof to one end part of said lower coil trunks and disposed substantially perpendicularly to said shaft, said first lower coil arms extending towards said shaft;

first upper coil arms electrically connected at one end part thereof to one end part of said upper coil trunks and disposed substantially perpendicularly to said shaft, said first upper coil arms extending towards said shaft and connected at a second end part thereof to a second end part of said first lower coil arms, adjacent said shaft;

brush means disposed to contact axially facing outer surfaces of said first upper coil arms;

a first electrical insulator disposed between and in contact with said first lower coil arms and one axial side surface of said armature core; and a second electrical insulator disposed between and in contact with said first lower coil arms and said first upper coil arms.

2. The electric rotating machine according to claim 1, further comprising:

second lower coil arms electrically connected at one end part thereof to a second end part of said lower coil trunks and disposed to extend substantially perpendicularly to said shaft;

second upper coil arms electrically connected at one end part thereof to a second end part of said upper coil trunks and disposed to extend substantially perpendicularly to said shaft, said second upper coil arms being connected at a second end part thereof to a second end part of said second lower coil arms;

a third electrical insulator disposed between and in contact with said second lower coil arms and a second side surface of said armature core; and a fourth electrical insulator disposed between and in contact with said second lower coil arms and said second upper coil arms, wherein said brush means includes a plurality of brushes contacting only said axial outer surfaces of said first upper coil arms.

3. The electric rotating machine according to claim 1, wherein said armature core is made of a plurality of metal plates contacting said shaft, and said first upper coil arms and said second electrical insulator have respective positioning means for engagement therebetween.

4. The electric rotating machine according to claim 2, wherein said first and second lower coil arms and said lower coil trunks are integrally formed, and said first and second upper coil arms and said upper coil trunks are integrally formed, respectively, and wherein said shaft extends through and is in contact with said armature core.

5. The electric rotating machine according to claim 1, wherein said first lower coil arms have axially protruding portions extending along said shaft at radially inner end parts thereof to electrically connect said first lower coil arms to radially inner end parts of said first upper coil arms, respectively.

6. The electric rotating machine according to claim 1 wherein a circumferential width of said first upper coil arms on which said brush means is disposed are circumferentially widened in radial direction towards an outer periphery of said armature core.

7. The electric rotating machine according to claim 6, wherein clearance grooves are formed by adjacent two said first upper coil arms, said clearance grooves being formed in a one of a substantially spiral and a radial shape extending in a direction opposite to a rotational direction of said armature core from a radially inner periphery to a radially outer periphery for providing an air flow path.

8. The electric rotating machine according to claim 1, wherein at least one of said upper coil trunks and said first upper coil arms are made of a good conductor with a Vickers hardness of at least about 55.

9. The electric rotating machine according to claim 1, wherein said first upper coil arms are formed in a flat shape by press machining.

10. The electric rotating machine according to claim 1, wherein said first upper coil arms are press machined and shear droop sides of said first upper coil arms are used as the sliding surfaces for said brush means.

11. The electric rotating machine according to claim 1, further comprising a metal holding plate disposed in the vicinity of said first upper coil arms and rotatably holding said shaft, said holding plate holding said brush means.

12. The electric rotating machine according to claim 1, wherein said first upper coil arms extend radially outwardly in a direction opposite to a rotation direction of said armature core, and wherein adjacent two of said first upper coil arms form a groove therebetween for a radial airflow path.

13. An electric rotating machine comprising:

an armature core including slots;

a shaft rotatably supporting said armature core;

upper coil trunks and lower coil trunks housed within said slots of said armature core;

lower coil arms electrically connected at one end part thereof to one end part of said lower coil trunks and disposed substantially perpendicularly to said shaft, said lower coil arms extending towards said shaft;

upper coil arms electrically connected at one end part thereof to one end part of said upper coil trunks and disposed substantially perpendicularly to said shaft, said upper coil arms extending towards said shaft and connected at a second end part thereof to a second end part of said lower coil arms;

said lower coil arms having axially protruding portions extending along said shaft at radially inner end parts thereof to electrically connect said lower coil arms to radially inner end parts of said upper coil arms, respectively; and collar means pressing said upper coil arms against a side of an axial end face of said armature core to prevent radial displacement of said upper coil arms towards an outer periphery of said armature core.

14. The electric rotating machine according to claim 13, wherein at least one of said upper and lower coil trunks and said upper and lower coil arms are made by processing at least one of a sheet material and a wire material.

15. An electric rotating machine comprising:

an armature core including slots;

a shaft rotatably supporting said armature core;

upper coil trunks and lower coil trunks housed within said slots of said armature core;

lower coil arms electrically connected at one end part thereof to one end part of said lower coil trunks and disposed substantially perpendicularly to said shaft, said lower coil arms extending towards said shaft;

upper coil arms electrically connected at one end part thereof to one end part of said upper coil trunks and disposed substantially perpendicularly to said shaft, said upper coil arms extending towards said shaft and connected at a second end part thereof to a second end part of said lower coil arms;

a metal brush means disposed on said upper coil arms;

a circumferential width of said upper coil arms on which said brush means is disposed being circumferentially widened in radial direction towards an outer periphery of said armature core;

clearance grooves being formed by adjacent two said upper coil arms, said clearance grooves being formed in a one of a substantially spiral and a substantially radial shape extending in a direction opposite to a rotational direction of said armature core from a radially inner periphery to a radially outer periphery for providing an air flow path;

a depth of said clearance grooves roughly matching a thickness of said upper coil arms.

16. The electric rotating machine according to claim 15, further comprising an insulator disposed between said lower coil arms and said upper coil arms provided with positioning parts for regulating circumferential and radial relative displacement between said upper coil arms and said lower coil arms.

17. An electric rotating machine comprising:

an armature core including slots;

a shaft rotatably supporting said armature core;

upper coil trunks and lower coil trunks housed within said slots of said armature core;

lower coil arms electrically connected at one end part thereof to one end part of said lower coil trunks and disposed substantially perpendicularly to said shaft, said lower coil arms extending towards said shaft;

upper coil arms electrically connected at one end part thereof to one end part of said upper coil trunks and disposed substantially perpendicularly to said shaft, said upper coil arms extending towards said shaft and connected at a second end part thereof to a second end part of said lower coil arms;

insulators disposed between said lower coil arms and said armature core and between said upper coil arms and said lower coil arms, respectively;

said insulator disposed between said lower coil arms and said upper coil arms being provided with positioning parts for regulating circumferential and radial relative displacement between upper coil arms and said lower coil arms, said positioning parts comprising holes provided in said insulator for receiving therein protrusion portions formed on said upper coil arms.

18. An electric rotating machine comprising:

an armature core including slots;

a shaft rotatably supporting said armature core;

upper coil trunks and lower coil trunks housed within said slots of said armature core;

lower coil arms electrically connected at one end part thereof to one end part of said lower coil trunks and disposed substantially perpendicularly to said shaft, said lower coil arms extending towards said shaft;

upper coil arms electrically connected at one end part thereof to one end part of said upper coil trunks and disposed substantially perpendicularly to said shaft, said upper coil arms extending towards said shaft and connected at a second end part thereof to a second end part of said lower coil arms;

insulators disposed between said lower coil arms and said armature core and between said upper coil arms and said lower coil arms, respectively;

said lower coil arms having axial protrusion parts extending towards radial end parts thereof, and wherein radially inner end parts of said insulators are inserted between said axial protrusion parts and are circumferentially adjacent to each other and have axially inner recessed parts recessed for positioning.

19. An electric rotating machine comprising:

an armature core including slots:

a shaft rotatably supporting said armature core;

upper coil trunks and lower coil trunks housed within said slots of said armature core;

first lower coil arms and second lower coil arms extending from first ends and second ends of said lower coil trunks, respectively, substantially perpendicularly towards said shaft, each of said first lower coil arms, said second lower coil arms and said lower coil trunks being formed integrally from a single coil;

first upper coil arms and second upper coil arms extending from first ends and second ends of said upper coil trunks, respectively, substantially perpendicularly towards said shaft, each of said first upper coil arms, said second upper coil arms and said upper coil trunks being formed integrally from a single coil; and brushes disposed on said first upper coil arms, wherein radial inner ends of said first upper coil arms and said second upper coil arms are electrically connected to radial inner ends of said first lower coil arms and said second lower coil arms, respectively, adjacent said shaft.

20. An electric rotating machine according to claim 19, wherein said radial inner ends of said first upper coil arms, said second upper coil arms, said first lower coil arms and said second lower coil arms have respective extensions extending axially along said shaft and electrically connected thereat.

21. An electric rotating machine comprising:

an armature core including slots;

a shaft rotatably supporting said armature core;

upper coil trunks and lower coil trunks housed within said slots of said armature core;

lower coil arms electrically connected at one end part thereof to one end part of said lower coil trunks and disposed substantially perpendicularly to said shaft, said lower coil arms extending towards said shaft;

upper coil arms electrically connected at one end part thereof to one end part of said upper coil trunks and disposed substantially perpendicularly to said shaft, said upper coil arms extending towards said shaft and connected at a second end part thereof to a second end part of said lower coil arms; and collars pressing said upper coil arms against a side of an axial end face of said armature core to prevent radial displacement of said upper coil arms towards an outer periphery of said armature core.

22. The electric rotating machine according to claim 21, wherein said lower coil arms have axially protruding portions extending along said shaft at radially inner end parts thereof to electrically connect said lower coil arms to radially inner end parts of said upper coil arms, respectively.

23. The electric rotating machine according to claim 22 wherein each of said collars has a fixing portion fixed to said shaft, a ring portion surrounding a radial outer surface of said axially protruding portion, and a connecting portion connecting said fixing portion and said ring portion.

24. An electric rotating machine comprising:

an armature core including slots;

a shaft rotatably supporting said armature core;

upper coil trunks and lower coil trunks housed within said slots of said armature core;

lower coil arms electrically connected at one end part thereof to one end part of said lower coil trunks and disposed substantially perpendicularly to said shaft, said lower coil arms extending towards said shaft;

upper coil arms electrically connected at one end part thereof to one end part of said upper coil trunks and disposed substantially perpendicularly to said shaft, said upper coil arms extending towards said shaft and connected at a second end part thereof to a second end part of said lower coil arms;

insulators disposed between said lower coil arms and said armature core and between said upper coil arms and said lower coil arms, respectively;

said insulator disposed between said lower coil arms and said coil arms being provided with positioning parts for regulating circumferential and radial relative displacement between upper coil arms and said lower coil arms, said positioning parts comprising one of holes and protrusion portions provided on said insulator and said upper coil arms has one of protrusion portions and holes provided thereon for engagement with said positioning parts of said insulator.

* * * * *